(12) United States Patent
Wang et al.

(10) Patent No.: US 11,982,790 B2
(45) Date of Patent: May 14, 2024

(54) OPTICAL IMAGING SYSTEM

(71) Applicant: ZHEJIANG SUNNY OPTICAL CO, LTD., Ningbo (CN)

(72) Inventors: Jian Wang, Ningbo (CN); Lingbo He, Ningbo (CN); Jianjun Li, Ningbo (CN); Fujian Dai, Ningbo (CN); Liefeng Zhao, Ningbo (CN)

(73) Assignee: ZHEJIANG SUNNY OPTICAL CO, LTD., Ningbo (CN)

( * ) Notice: Subject to any disclaimer, the term of this patent is extended or adjusted under 35 U.S.C. 154(b) by 735 days.

(21) Appl. No.: 17/067,099

(22) Filed: Oct. 9, 2020

(65) Prior Publication Data

US 2021/0181484 A1 Jun. 17, 2021

(30) Foreign Application Priority Data

Dec. 16, 2019 (CN) .......................... 201911295487.X

(51) Int. Cl.
*G02B 9/64* (2006.01)
*G02B 13/00* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .......... G02B 9/64; G02B 13/06; G02B 13/18; G02B 13/0015; G02B 13/0045; G02B 15/177; G02B 27/0025
See application file for complete search history.

(56) References Cited

U.S. PATENT DOCUMENTS 5,754,345 A * 5/1998 Yamamoto ............. G02B 13/06
359/784
7,199,947 B2 * 4/2007 Wang ..................... G02B 13/16
359/755

(Continued)

FOREIGN PATENT DOCUMENTS

CN 109960004 A * 7/2019 ......... G02B 13/0045
JP 2013195637 A * 9/2013

OTHER PUBLICATIONS

Sensics, Converting Diagonal FOV and Aspect Ratio to Horizontal and Vertical FOV, 2016, pp. 1-3 [online], [retrieved Apr. 21, 2023], retrieved from the Internet <URL: https://medium.com/insights-on-virtual-reality/converting-diagonal-field-of-view-and-aspect-ratio...13bcc1d8600c >. (Year: 2016).*

(Continued)

*Primary Examiner* — Ephrem Z Mebrahtu
*Assistant Examiner* — Wesley Scott Ashton
(74) *Attorney, Agent, or Firm* — Sughrue Mion, PLLC

(57) ABSTRACT

The present disclosure discloses an optical imaging system including, sequentially from an object side to an image side along an optical axis, a first lens, a second lens, a third lens, a fourth lens, a fifth lens, a sixth lens, and a seventh lens. Each of the first lens to seventh lens has refractive power. An object-side surface of the first lens is concave, and an image-side surface thereof is concave; an object-side surface of the second lens is convex, and an image-side surface thereof is convex; and an object-side surface of the third lens is concave, and an image-side surface thereof is convex. An effective focal length f4 of the fourth lens and a total effective focal length f of the optical imaging system satisfy $-2.0<f4/f<-1.5$. Half of a maximal field-of-view Semi-FOV of the optical imaging system satisfies Semi-FOV$\geq 55°$.

18 Claims, 12 Drawing Sheets

(56) References Cited

U.S. PATENT DOCUMENTS

| | | | | |
|---|---|---|---|---|
| 7,869,134 | B2* | 1/2011 | Matsusaka | G02B 15/177 |
| | | | | 359/680 |
| 9,297,983 | B2* | 3/2016 | Kubota | G02B 9/60 |
| 10,678,026 | B2* | 6/2020 | Son | G02B 9/64 |
| 11,092,770 | B2* | 8/2021 | Wenren | G02B 13/0045 |
| 11,733,483 | B2* | 8/2023 | Zhang | G02B 13/16 |
| | | | | 359/755 |
| 2004/0189833 | A1* | 9/2004 | Magimori | G02B 15/177 |
| | | | | 348/240.99 |
| 2006/0007561 | A1* | 1/2006 | Suzuki | G02B 13/06 |
| | | | | 359/749 |
| 2010/0091381 | A1* | 4/2010 | Katakura | G02B 15/143503 |
| | | | | 359/676 |
| 2012/0314305 | A1* | 12/2012 | Miyagawa | G02B 13/04 |
| | | | | 359/784 |
| 2014/0139931 | A1* | 5/2014 | Kubota | G02B 9/60 |
| | | | | 359/740 |
| 2016/0377839 | A1* | 12/2016 | Chen | G02B 13/0045 |
| | | | | 359/708 |
| 2019/0154974 | A1* | 5/2019 | Chen | G02B 27/0037 |
| 2021/0003820 | A1* | 1/2021 | Zhang | G02B 13/16 |
| 2021/0096331 | A1* | 4/2021 | Wang | G02B 9/64 |

OTHER PUBLICATIONS

Understanding Focal Length and Field of View, 2016, pp. 1-7 [online], [retrieved May 1, 2023], retrieved from the Internet <URL: https://www.vision-systems.com/sponsored/edmund-optics/article/16752143/understanding-focal-length-and-field-of-view >. (Year: 2016).*

Mortimer Abramowitz et al., Introduction to Lenses and Geometrical Optics, (2018), pp. 1-8 [online], [retrieved Apr. 20, 2023], retrieved from the Internet <URL: https://micro.magnet.fsu.edu/primer/lightandcolor/lensesintro.html>. (Year: 2018).*

Melike Güzin Semercioğlu, Basic Parameters of Lens Design, 7 International Journal of Heatlh Services Research and Policy 209-220 (2022). (Year: 2022).*

Libin Sun et al., Lens Factory: Automatic Lens Generation Using Off-the-shelf Components, 2015, pp. 1-12 [online], [retrieved Aug. 22, 2023], retrieved from the Internet <URL: https://arxiv.org/pdf/1506.08956.pdf>. (Year: 2015).*

* cited by examiner

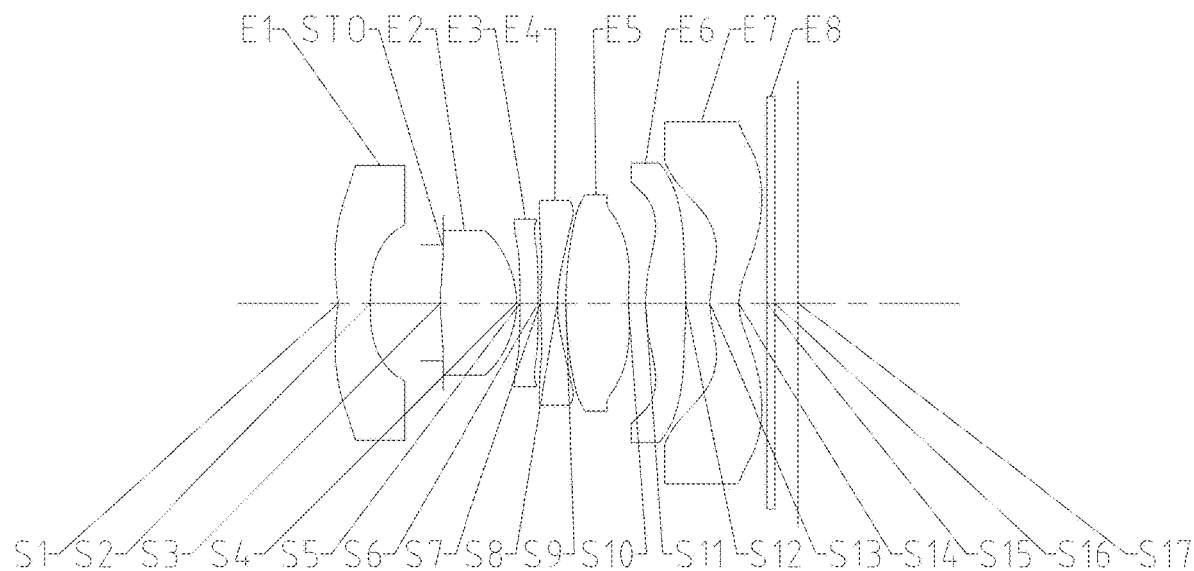
Fig. 5
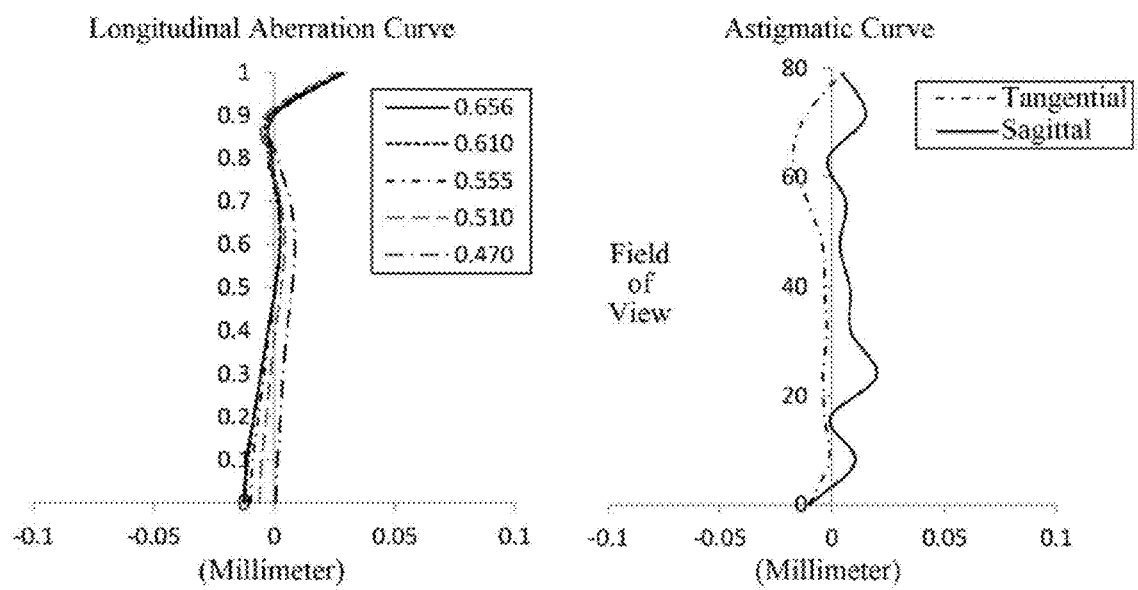
Fig. 6A
Fig. 6B

OPTICAL IMAGING SYSTEM

CROSS-REFERENCE TO RELATED APPLICATION

This application claims benefit of priority to Chinese Patent Application No. 201911295487.X filed on Dec. 16, 2019 before the China National Intellectual Property Administration, the entire disclosure of which is incorporated herein by reference in its entity.

TECHNICAL FIELD

The present disclosure relates to the field of optical elements, and more specifically, relates to an optical imaging system.

BACKGROUND

A camera module is usually installed on the portable device, such as mobile phone, so that the mobile phone has camera function. The camera module is usually provided with a Charge-coupled Device (CCD) type image sensor or a Complementary Metal Oxide Semiconductor (CMOS) type image sensor, and is provided with an optical imaging system. The optical imaging system may collect the light on the object side, and the imaging light travels along the optical path of the optical imaging system and illuminates on the image sensor. The image sensor converts the light signal into an electrical signal to form image data.

In recent years, with the upgrading of the portable device and the development of image software functions and video software functions on the portable device, the hardware used in the portable device is constantly updated and developed. Also, it is expected that the pixel, image quality, resolution and other performance of the camera module applicable to the portable device will get better and better. For example, with the continuous advancement of CCD image sensor or CMOS image sensor technology, the pixel size on the chip continues to decrease and the number of pixels continues to increase. The performance of the optical imaging system suitable to the image sensor also needs to be higher and higher. Moreover, the user demands for the portable device have become more diverse. In addition to performance, such as high pixels, high resolution, and high relative brightness, the optical imaging system is also required to have a large field-of-view, so that the optical imaging system can clearly image the scene.

In order to meet the assembly requirements of the portable device and meet the imaging requirements, an optical imaging system that can simultaneously satisfy the characteristics of wide-angle, large aperture and high image quality, is required.

SUMMARY

The present disclosure provides an optical imaging system that is applicable to portable electronic products and at least solves or partially solves at least one of the above disadvantages of the prior art.

The present disclosure provides an optical imaging system which includes, sequentially from an object side to an image side along an optical axis, a first lens, a second lens, a third lens, a fourth lens, a fifth lens, a sixth lens and a seventh lens. Each of the first lens to the seventh lens has refractive power. An object-side surface of the first lens is a concave surface, and an image-side surface thereof is a concave surface; an object-side surface of the second lens is a convex surface, and an image-side surface thereof is a convex surface; and an object-side surface of the third lens is a concave surface, and an image-side surface thereof is a convex surface.

In one embodiment, the object-side surface of the first lens to an image-side surface of the seventh lens may have at least one aspheric surface.

In one embodiment, an effective focal length f4 of the fourth lens and a total effective focal length f of the optical imaging system may satisfy $-2.0 < f4/f < -1.5$.

In one embodiment, half of a maximal field-of-view Semi-FOV of the optical imaging system may satisfy Semi-FOV$\geq 55°$.

In one embodiment, an effective focal length f1 of the first lens and an effective focal length f2 of the second lens may satisfy $-2.5 < f1/f2 < -2.0$.

In one embodiment, an effective focal length f6 of the sixth lens and an effective focal length f7 of the seventh lens may satisfy $-2.5 < f7/f6 < -1.0$.

In one embodiment, a radius of curvature R1 of the object-side surface of the first lens and a radius of curvature R4 of the image-side surface of the second lens may satisfy $3.5 < R1/R4 < 4.0$.

In one embodiment, a radius of curvature R2 of the image-side surface of the first lens and a radius of curvature R3 of the object-side surface of the second lens may satisfy $1.0 < R3/R2 < 1.5$.

In one embodiment, a radius of curvature R13 of an object-side surface of the seventh lens and a radius of curvature R14 of an image-side surface of the seventh lens may satisfy $4.5 < (R13+R14)/(R13-R14) < 6.0$.

In one embodiment, a radius of curvature R8 of an image-side surface of the fourth lens, a radius of curvature R9 of an object-side surface of the fifth lens and a radius of curvature R11 of an object-side surface of the sixth lens may satisfy $1.0 < R9/(R8+R11) < 2.0$.

In one embodiment, a center thickness CT3 of the third lens along the optical axis, a center thickness CT4 of the fourth lens along the optical axis and a center thickness CT5 of the fifth lens along the optical axis may satisfy $1.5 < CT5/(CT3+CT4) < 2.0$.

In one embodiment, a sum of center thicknesses $\Sigma CT$ of the first lens to the seventh lens along the optical axis and a center thickness CT2 of the second lens along the optical axis may satisfy $3.5 < \Sigma CT/CT2 < 4.0$.

In one embodiment, a sum of spaced intervals $\Sigma AT$ between each two adjacent lenses of the first lens to the seventh lens along the optical axis and a spaced interval T12 between the first lens and the second lens along the optical axis may satisfy $1.0 < \Sigma AT/T12 < 2.0$.

In one embodiment, a center thickness CT6 of the sixth lens along the optical axis and a spaced interval T67 between the sixth lens and the seventh lens along the optical axis may satisfy $1.0 < CT6/T67 < 2.5$.

In one embodiment, a refractive index N3 of the third lens may satisfy $N3 > 1.60$, a refractive index N4 of the fourth lens may satisfy $N4 > 1.60$, and a refractive index N4 of the seventh lens may satisfy $N7 > 1.60$.

In one embodiment, an Abbe number V3 of the third lens may satisfy $V3 < 25.0$, and an Abbe number V4 of the fourth lens may satisfy $V4 < 25.0$.

The present disclosure employs seven lenses, and the optical imaging system has at least one beneficial effect, such as wide angle, large aperture, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging system according to example 3 of the present disclosure; and FIGS. 6A to 6C illustrate a longitudinal aberration curve, an astigmatic curve, and a lateral color curve of the optical imaging system of the example 3, respectively.

DETAILED DESCRIPTION OF EMBODIMENTS

Figure 1:
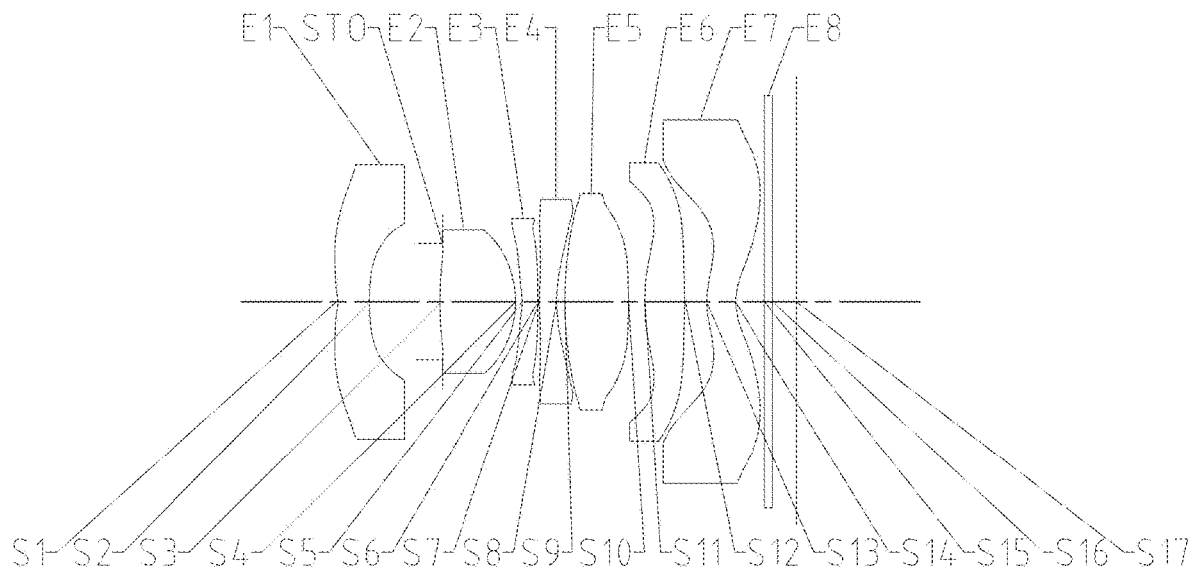
FIG. 1 illustrates a schematic structural view of an optical imaging system according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens has positive or negative refractive power, an object-side surface thereof may be a concave surface, and an image-side surface thereof may be a concave surface; the second lens has positive or negative refractive power, an object-side surface thereof may be a convex surface, and an image-side surface thereof may be a convex surface; the third lens has positive or negative refractive power, an object-side surface thereof may be a concave surface, and an image-side surface thereof may be a convex surface; the fourth lens has positive or negative refractive power; the fifth lens has positive or negative refractive power; the sixth lens has positive or negative refractive power; and the seventh lens has positive or negative refractive power. The low-order aberrations of the system are effectively compensated by rationally controlling the positive or negative distribution of the refractive power and the surface curvature of each component in the system. By rationally configuring the shape of the first lens, it is possible to ensure that the first lens has good workability and enable the optical imaging system to have a relative large field-of-view. By rationally configuring the shape of the second lens, the tolerance sensitivity of the optical imaging system may be effectively reduced. By rationally configuring the shape of the third lens, it is beneficial to reduce the astigmatic of the optical imaging system.

In an exemplary embodiment, a refractive index N3 of the third lens may satisfy N3>1.60, a refractive index N4 of the fourth lens may satisfy N4>1.60, and a refractive index N7 of the seventh lens may satisfy N7>1.60. More specifically, the refractive index N3 of the third lens, the refractive index N4 of the fourth lens, and the refractive index N7 of the seventh lens may be greater than 1.62, respectively. The third lens, the fourth lens and the seventh lens are made of materials with high refractive index, which is beneficial to correct the off-axis coma and astigmatic of the optical imaging system, and improve the image quality in the external field-of-view.

In an exemplary embodiment, an Abbe number V3 of the third lens may satisfy V3<25.0, and an Abbe number V4 of the fourth lens may satisfy V4<25.0. More specifically, the Abbe number V3 of the third lens and the Abbe number V4 of the fourth lens may be less than 22, respectively. By limiting the Abbe number of the third lens and the Abbe number of the fourth lens satisfy the aforementioned conditional expressions, it is beneficial to correct the off-axis coma and astigmatic of the optical imaging system, thereby improving the image quality in the external field-of-view.

In an exemplary embodiment, the optical imaging system according to the present disclosure may satisfy: Semi-FOV≥55°, where Semi-FOV is half of a maximal field-of-view of the optical imaging system. More specifically, Semi-FOV may satisfy: 55≤Semi-FOV≤85°. By properly configuring the maximal field-of-view of the optical imaging system, the optical imaging system may obtain a larger field-of-view and improve the ability of the optical imaging system to collect the information at the object side.

In an exemplary embodiment, the optical imaging system according to the present disclosure may satisfy: −2.0<f4/f<−1.5, where f4 is an effective focal length of the fourth lens, and f is a total effective focal length of the optical imaging system. More specifically, f4 and f may satisfy: −1.80<f4/f<−1.65. By setting the fourth lens to have negative refractive power and controlling its magnitude, the fourth lens assumes the negative refractive power required by the optical imaging system. Moreover, by controlling the ratio of the effective focal length of the fourth lens to the total effective focal length, it is beneficial to control the spherical aberration contributed by the fourth lens in an appropriate range, so as to ensure that the lenses on the image side of the fourth lens may properly correct the negative spherical aberration contributed by the fourth lens, and thus the on-axis field of the optical imaging system may stably have better image quality.

In an exemplary embodiment, the optical imaging system according to the present disclosure may satisfy: −2.5<f1/f2<−2.0, where f1 is an effective focal length of the first lens, and f2 is an effective focal length of the second lens. More specifically, f1 and f2 may satisfy: −2.20<f1/f2<−2.05. By controlling the ratio of the effective focal length of the first lens to the effective focal length of the second lens, it is beneficial to make the refractive power of the first lens and the refractive power of the second lens cooperate with each other, and thus to compensate the off-axis aberrations of the optical imaging system.

In an exemplary embodiment, the optical imaging system according to the present disclosure may satisfy: −2.5<f7/f6<−1.0, where f6 is an effective focal length of the sixth lens, and f7 is an effective focal length of the seventh lens. More specifically, f6 and f7 may satisfy: −2.10<f7/f6<−1.20. By reasonably limiting the refractive power of the sixth lens and the refractive power of the seventh lens, it is beneficial to compensate the off-axis aberrations of the optical imaging system.

In an exemplary embodiment, the optical imaging system according to the present disclosure may satisfy: 3.5<R1/R4<4.0, where R1 is a radius of curvature of the object-side surface of the first lens, and R4 is a radius of curvature of the image-side surface of the second lens. More specifically, R1 and R4 may satisfy: 3.55<R1/R4<0. By controlling the ratio of the radius of curvature of the object-side surface of the first lens to the radius of curvature of the image-side surface of the second lens, the optical imaging system may better achieve the deflection of the optical path.

In an exemplary embodiment, the optical imaging system according to the present disclosure may satisfy: 1.0<R3/R2<5, where R2 is a radius of curvature of the image-side surface of the first lens, and R3 is a radius of curvature of the object-side surface of the second lens. More specifically, R2 and R3 may satisfy: 1.01<R3/R2<1.10. By controlling the ratio of the radius of curvature of the object-side surface of the second lens to the radius of curvature of the image-side surface of the first lens, it is beneficial to better control the total deflection angle of the edge field at the two surfaces in the desired range, and effectively reduce the sensitivity of the optical imaging system. When the four surfaces of the first lens and the second lens are defined at the same time, it is beneficial to better deflect the optical path.

In an exemplary embodiment, the optical imaging system according to the present disclosure may satisfy: 4.5<(R13+R14)/(R13−R14)<6.0, where R13 is a radius of curvature of an object-side surface of the seventh lens, and R14 is a radius of curvature of an image-side surface of the seventh lens. More specifically, R13 and R14 may satisfy: 4.65<(R13+R14)/(R13−R14)<5.80. The coordination of the object-side surface of the seventh lens and the image-side surface of the seventh lens is beneficial to reducing the coma in the on-axis field of the optical imaging system and the coma in the off-axis field of the optical imaging system, thereby enabling the optical imaging system to have good image quality.

In an exemplary embodiment, the optical imaging system according to the present disclosure may satisfy: 1.0<R9/

(R8+R11)<2.0, where R8 is a radius of curvature of an image-side surface of the fourth lens, R9 is a radius of curvature of an object-side surface of the fifth lens, and R11 is a radius of curvature of an object-side surface of the sixth lens. More specifically, R8, R9 and R11 may satisfy: $1.20<R9/(R8+R11)<1.75$. By rationally configuring the radius of curvature of the image-side surface of the fourth lens, the radius of curvature of the object-side surface of the fifth lens and the radius of curvature of the object-side surface of the sixth lens, it is possible to ensure that the chief ray angle (CRA) of the optical imaging system matches the photosensitive chip. In addition, the field curvature of the optical imaging system may be corrected, and each field-of-view of the optical imaging system may have better image clarity.

In an exemplary embodiment, the optical imaging system according to the present disclosure may satisfy: $1.5<CT5/(CT3+CT4)<2.0$, where CT3 is a center thickness of the third lens along the optical axis, CT4 is a center thickness of the fourth lens along the optical axis, and CT5 is a center thickness of the fifth lens along the optical axis. More specifically, CT3, CT4 and CT5 may satisfy: $1.80<CT5/(CT3+CT4)<1.90$. By rationally configuring the center thickness of the third lens, the center thickness of the fourth lens and the center thickness of the fifth lens, the three lenses may be easily obtained by injection molding, so as to improve the workability of the optical imaging system. In addition, the better image quality of the optical imaging system is ensured.

In an exemplary embodiment, the optical imaging system according to the present disclosure may satisfy: $3.5<\Sigma CT/CT2<4.0$, where $\Sigma CT$ is a sum of center thicknesses of the first lens to the seventh lens along the optical axis, and CT2 is a center thickness of the second lens along the optical axis. As an example, $\Sigma CT=CT1+CT2+CT3+CT4+CT5+CT6+CT7$. More specifically, $\Sigma CT$ and CT2 may satisfy: $3.52<\Sigma CT/CT2<3.76$. By properly controlling the relationship between the thickness of the second lens and the sum of the thicknesses of the lenses of the optical imaging system, the shape of the second lens may be effectively restricted, and the range of residual distortion after compensation may be better controlled, so that the optical imaging system has a good distortion performance.

In an exemplary embodiment, the optical imaging system according to the present disclosure may satisfy: $1.0<\Sigma AT/T12<2.0$, where $\Sigma AT$ is a sum of spaced intervals between each two adjacent lenses of the first lens to the seventh lens along the optical axis, and T12 is a spaced interval between the first lens and the second lens along the optical axis. As an example, $\Sigma AT=T12+T23+T34+T45+T56+T67$. More specifically, $\Sigma AT$ and T12 may satisfy: $1.20<\Sigma AT/T12<1.85$. By properly controlling the ratio of the sum of air intervals between each two adjacent lenses from the first lens to the lens closest to the imaging plane of the optical imaging system to the air interval between the first lens and the second lens, the interval sensitivity of the optical imaging system may be effectively reduced, and the field curvature of the optical imaging system may be corrected.

In an exemplary embodiment, the optical imaging system according to the present disclosure may satisfy: $1.0<CT6/T67<2.5$, where CT6 is a center thickness of the sixth lens along the optical axis, and T67 is a spaced interval between the sixth lens and the seventh lens along the optical axis. More specifically, CT6 and T67 may satisfy: $1.40<CT6/T67<2.20$. By constraining the center thickness of the sixth lens along the optical axis and the air interval at the image side of the sixth lens, the field curvature and distortion of the optical imaging system may be effectively controlled, thereby improving the image quality of the optical imaging system.

In an exemplary embodiment, the above optical imaging system may further include a stop. The stop may be disposed at an appropriate position as required, for example, between the object side and the first lens or between the first lens and the second lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical performances, such as wide angle, large aperture, high resolution, and high image quality.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the surfaces of the first lens and the second lens are aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG.

Figures 2A, 2B:
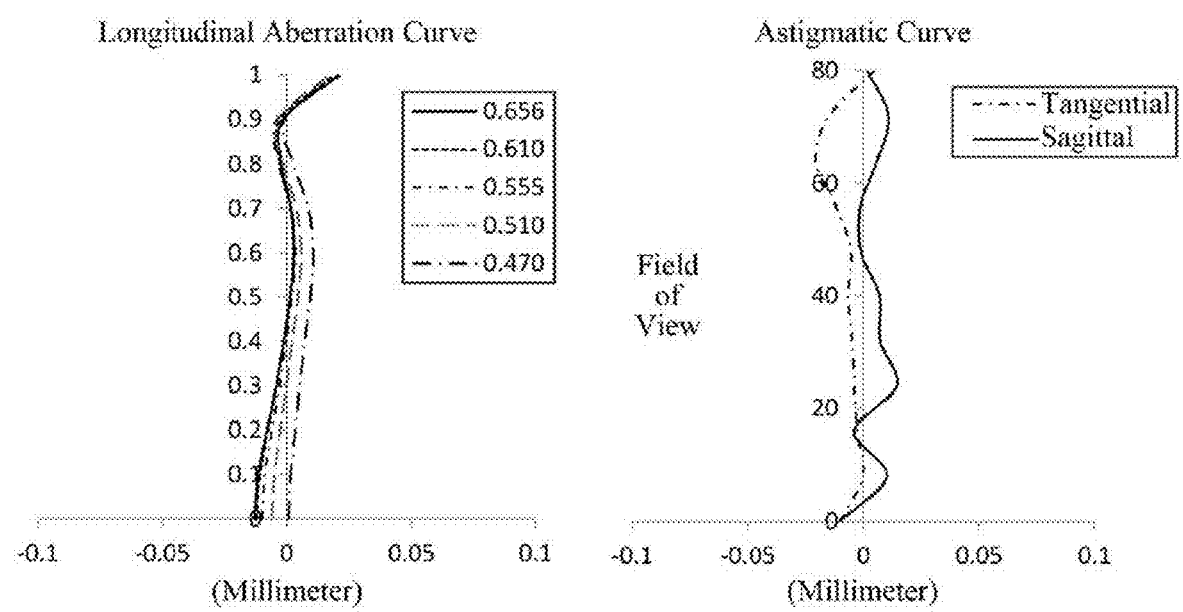
FIGS. 2A to 2C illustrate a longitudinal aberration curve, an astigmatic curve, and a lateral color curve of the optical imaging system of the example 1, respectively.
Figure 2C:
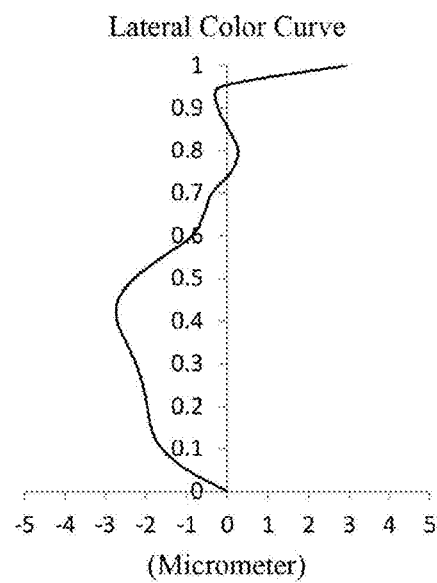

1 to FIG. 2C. FIG. 1 shows a schematic structural view of the optical imaging system according to example 1 of the present disclosure.

As shown in FIG. 1, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

Table 1 is a table illustrating basic parameters of the optical imaging system of example 1, wherein the units for the radius of curvature, the thickness/distance and the focal length are millimeter (mm).

In example 1, a total effective focal length f of the optical imaging system is 1.97 mm, an aperture number Fno of the optical imaging system is 1.70, an on-axis distance TTL from the object-side surface S1 of the first lens E1 to the imaging plane S17 is 6.40 mm, half of a diagonal length ImgH of an effective pixel area on the imaging plane S17 is 3.07 mm, and half of a maximal field-of-view Semi-FOV is 80.0°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| S1 | Aspheric | −4.4618 | 0.4631 | 1.55 | 56.1 | −3.98 | −48.8831 |
| S2 | Aspheric | 4.3816 | 1.0129 | | | | −17.8267 |
| STO | Spherical | Infinite | −0.0353 | | | | |
| S3 | Aspheric | 4.6075 | 1.0597 | 1.55 | 56.1 | 1.88 | 26.1063 |
| S4 | Aspheric | −1.2154 | 0.0500 | | | | −1.5694 |
| S5 | Aspheric | −10.3178 | 0.2500 | 1.68 | 19.2 | −95.20 | 89.7670 |
| S6 | Aspheric | −12.4026 | 0.0350 | | | | 90.0000 |
| S7 | Aspheric | 8.5633 | 0.2300 | 1.67 | 20.4 | −3.42 | 34.4847 |
| S8 | Aspheric | 1.7818 | 0.1168 | | | | −18.1974 |
| S9 | Aspheric | 6.2242 | 0.8846 | 1.55 | 56.1 | 8.06 | 10.9489 |
| S10 | Aspheric | −14.2444 | 0.2227 | | | | 90.0000 |
| S11 | Aspheric | 2.8762 | 0.5565 | 1.55 | 56.1 | 4.13 | −2.4443 |
| S12 | Aspheric | −9.7207 | 0.3036 | | | | −35.3621 |
| S13 | Aspheric | 1.1003 | 0.4000 | 1.64 | 56.1 | −5.39 | −7.3940 |
| S14 | Aspheric | 0.7167 | 0.4105 | | | | −3.6067 |
| S15 | Spherical | Infinite | 0.1106 | 1.62 | 64.2 | | |
| S16 | Spherical | Infinite | 0.3320 | | | | |
| S17 | Spherical | Infinite | | | | | |

TABLE 2

| Surface number | A4 | A6 | A8 | A10 | A12 |
|---|---|---|---|---|---|
| S1 | 5.1470E−01 | −9.6605E−02 | 1.3971E−02 | −4.3960E−03 | 1.7240E−03 |
| S2 | 2.9078E−01 | −4.5473E−04 | 3.0262E−03 | −1.0892E−04 | −4.7303E−06 |
| S3 | −3.8998E−02 | −5.3589E−03 | −9.1690E−04 | −1.5765E−04 | −3.7133E−05 |
| S4 | −1.7346E−02 | −1.1575E−02 | 2.0257E−03 | −8.9401E−04 | 3.4000E−04 |
| S5 | −2.4607E−02 | −5.3346E−03 | 9.1647E−03 | −5.1080E−04 | 4.5896E−04 |
| S6 | −8.4000E−03 | −9.6300E−03 | 9.8461E−03 | 4.4490E−05 | 2.7024E−04 |
| S7 | −1.0360E−01 | 9.6232E−03 | 4.0024E−03 | −1.1988E−04 | −3.0032E−04 |
| S8 | 1.5713E−02 | −6.6345E−03 | 1.7486E−03 | −1.6779E−03 | 3.5531E−04 |
| S9 | 4.1373E−03 | −8.5409E−03 | 2.7910E−03 | −1.2411E−05 | 2.1686E−04 |
| S10 | −3.2035E−01 | 3.7432E−02 | 1.0568E−02 | 3.2219E−03 | 4.9027E−03 |
| S11 | 4.9713E−01 | −7.6347E−02 | 1.7302E−02 | −4.9401E−03 | 5.1302E−03 |
| S12 | −1.3020E−01 | 4.5125E−02 | 2.3628E−02 | −1.4560E−03 | 7.8283E−05 |
| S13 | −1.4545E+00 | 3.0626E−01 | −6.7329E−04 | −6.6878E−04 | −9.0549E−03 |
| S14 | −1.2567E+00 | 2.1685E−01 | −7.3456E−02 | 3.2497E−02 | −8.7027E−03 |

| Surface number | A14 | A16 | A18 | A20 |
|---|---|---|---|---|
| S1 | −4.0231E−04 | 1.3085E−04 | −5.5374E−05 | 1.0130E−05 |
| S2 | 6.0360E−05 | −1.2500E−05 | 2.7057E−05 | −3.5131E−06 |
| S3 | −1.3026E−05 | −9.6888E−06 | −2.1428E−06 | −3.1395E−06 |
| S4 | −1.5208E−04 | 5.4205E−05 | −1.2023E−05 | 9.9513E−07 |
| S5 | −3.8529E−04 | 1.4995E−04 | −2.6945E−05 | 1.7052E−05 |
| S6 | −3.1343E−04 | 5.0128E−05 | −6.8059E−06 | 2.5375E−06 |
| S7 | −1.6811E−04 | 4.8081E−05 | 1.3673E−05 | −5.7853E−06 |
| S8 | −2.0914E−04 | 1.8276E−05 | −1.5210E−05 | 1.3625E−06 |
| S9 | −3.9256E−05 | −1.1288E−06 | 4.2687E−05 | 2.1941E−06 |
| S10 | 9.9641E−04 | 6.3392E−04 | 1.7663E−04 | 7.8348E−05 |
| S11 | 1.8246E−03 | −3.9832E−04 | −5.2298E−04 | 5.3113E−05 |
| S12 | 2.7784E−03 | 4.3598E−03 | 5.9953E−04 | 1.7862E−04 |
| S13 | 1.0724E−03 | −5.7523E−04 | −6.7920E−04 | 5.3074E−04 |
| S14 | 3.7867E−03 | −1.4719E−03 | 3.0681E−04 | −3.1088E−05 |

FIG. 2A illustrates a longitudinal aberration curve of the optical imaging system according to example 1, representing deviations of focal points converged by light of different wavelengths after passing through the system. FIG. 2B illustrates an astigmatic curve of the optical imaging system according to example 1, representing a curvature of a tangential plane and a curvature of a sagittal plane. FIG. 2C illustrates a lateral color curve of the optical imaging system according to example 1, representing deviations of different image heights on an imaging plane after light passes through the system. It can be seen from FIG. 2A to FIG. 2C that the optical imaging system provided in example 1 may achieve good image quality.

Example 2

Figure 3:
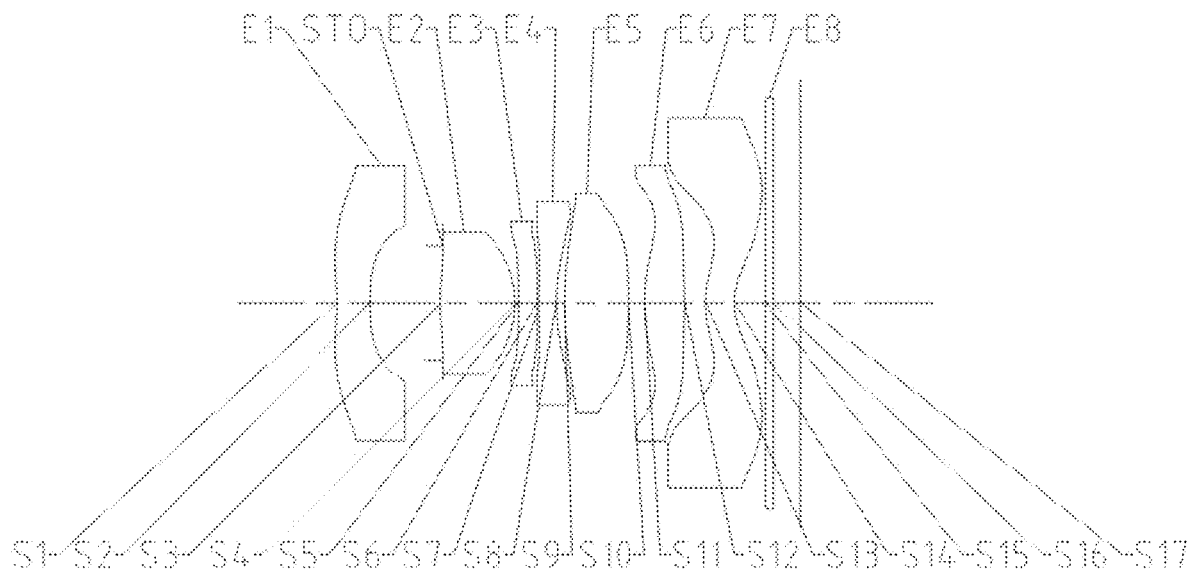
FIG. 3 illustrates a schematic structural view of an optical imaging system according to example 2 of the present disclosure.

An optical imaging system according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 2, a total effective focal length f of the optical imaging system is 1.97 mm, an aperture number Fno of the optical imaging system is 1.70, an on-axis distance TTL from the object-side surface S1 of the first lens E1 to the imaging plane S17 is 6.47 mm, half of a diagonal length ImgH of an effective pixel area on the imaging plane S17 is 3.07 mm, and half of a maximal field-of-view Semi-FOV is 82.4°.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| S1 | Aspheric | −4.4348 | 0.4631 | 1.55 | 56.1 | −3.99 | −48.8831 |
| S2 | Aspheric | 4.4301 | 1.0180 | | | | −13.3282 |
| STO | Spherical | Infinite | −0.0370 | | | | |
| S3 | Aspheric | 4.6306 | 1.0443 | 1.55 | 56.1 | 1.88 | 26.1063 |
| S4 | Aspheric | −1.2146 | 0.0500 | | | | −1.7000 |
| S5 | Aspheric | −10.3114 | 0.2596 | 1.68 | 19.2 | −91.39 | 89.8576 |
| S6 | Aspheric | −12.4974 | 0.0350 | | | | 90.0000 |
| S7 | Aspheric | −65.0000 | 0.2300 | 1.67 | 20.4 | −3.34 | −90.0000 |
| S8 | Aspheric | 2.3107 | 0.1174 | | | | −17.9586 |
| S9 | Aspheric | 6.2823 | 0.8890 | 1.55 | 56.1 | 8.14 | 4.3256 |
| S10 | Aspheric | −14.4064 | 0.2238 | | | | 89.5414 |
| S11 | Aspheric | 2.8779 | 0.5565 | 1.55 | 56.1 | 4.13 | −1.4337 |
| S12 | Aspheric | −9.7299 | 0.2869 | | | | −62.0929 |
| S13 | Aspheric | 1.1675 | 0.4000 | 1.64 | 56.1 | −7.08 | −5.5851 |
| S14 | Aspheric | 0.8048 | 0.4490 | | | | −2.1696 |
| S15 | Spherical | Infinite | 0.1106 | 1.62 | 64.2 | | |
| S16 | Spherical | Infinite | 0.3703 | | | | |
| S17 | Spherical | Infinite | | | | | |

TABLE 4

| Surface number | A4 | A6 | A8 | A10 | A12 |
|---|---|---|---|---|---|
| S1 | 5.7456E−01 | −1.2191E−01 | 1.7389E−02 | −5.3234E−03 | 2.4799E−03 |
| S2 | 3.4154E−01 | 1.6972E−04 | 3.6608E−03 | −4.7255E−04 | 4.3125E−05 |
| S3 | −3.9536E−02 | −5.9654E−03 | −1.0830E−03 | −1.8133E−04 | −5.3860E−05 |
| S4 | −3.3172E−02 | −2.0378E−02 | 3.6046E−03 | −1.8418E−03 | 6.9241E−04 |
| S5 | −3.1811E−02 | −3.4411E−03 | 1.3981E−02 | −8.8906E−04 | 8.4288E−04 |
| S6 | −2.4285E−02 | 6.2839E−03 | 1.9696E−02 | −3.8728E−04 | 4.7266E−04 |
| S7 | −3.8824E−02 | 6.4637E−03 | 7.7709E−03 | −2.1135E−03 | 2.7299E−04 |
| S8 | −7.7131E−03 | −2.0225E−02 | −5.9482E−03 | −5.5324E−03 | −7.9399E−04 |
| S9 | −1.0033E−02 | −1.3086E−02 | 8.4086E−03 | −1.7949E−03 | 5.1467E−04 |
| S10 | −3.5708E−01 | 3.4716E−02 | 1.4106E−02 | 6.0758E−03 | 7.5615E−03 |
| S11 | −5.7024E−01 | −6.2517E−02 | 3.0849E−02 | 2.0125E−03 | 6.8722E−03 |
| S12 | −1.5257E−01 | −3.2803E−02 | 4.1440E−02 | 3.4354E−03 | −2.1127E−03 |
| S13 | −1.5113E+00 | 3.1329E−01 | 1.9148E−02 | −1.1769E−02 | −6.2545E−03 |
| S14 | −1.9218E+00 | 4.0925E−01 | −1.1750E−01 | 5.5666E−02 | −1.7290E−02 |

| Surface number | A14 | A16 | A18 | A20 |
|---|---|---|---|---|
| S1 | −6.7231E−04 | 1.8659E−04 | −9.0643E−05 | 1.2607E−05 |
| S2 | 5.9618E−05 | 2.0118E−06 | 2.2773E−05 | −4.0860E−06 |
| S3 | −1.9107E−05 | −1.2897E−05 | −3.6115E−06 | −3.7055E−06 |
| S4 | −3.1449E−04 | 1.0862E−04 | −4.4294E−05 | 8.5810E−06 |
| S5 | −5.5380E−04 | 1.4669E−04 | −7.3990E−07 | 4.0360E−05 |
| S6 | −5.4877E−04 | −4.3661E−04 | 1.2507E−04 | −4.5540E−05 |
| S7 | −6.1478E−04 | −3.3902E−04 | 2.0410E−04 | −9.9626E−05 |
| S8 | −1.5421E−03 | −2.8833E−05 | −1.7942E−04 | −6.2314E−06 |
| S9 | −1.4055E−03 | −4.0883E−05 | −1.5904E−04 | 2.7485E−05 |
| S10 | 2.3467E−03 | 1.0998E−03 | 4.0892E−04 | 1.2003E−04 |
| S11 | 1.5020E−03 | −1.3740E−03 | −4.6117E−04 | 1.1108E−04 |
| S12 | 1.5176E−03 | −3.5422E−03 | 1.4678E−03 | 2.4375E−04 |
| S13 | −1.5645E−03 | 1.2598E−03 | −2.8705E−05 | −5.1463E−05 |
| S14 | 4.2182E−03 | −1.9620E−03 | 1.0063E−04 | −1.7915E−04 |

Figure 4A:
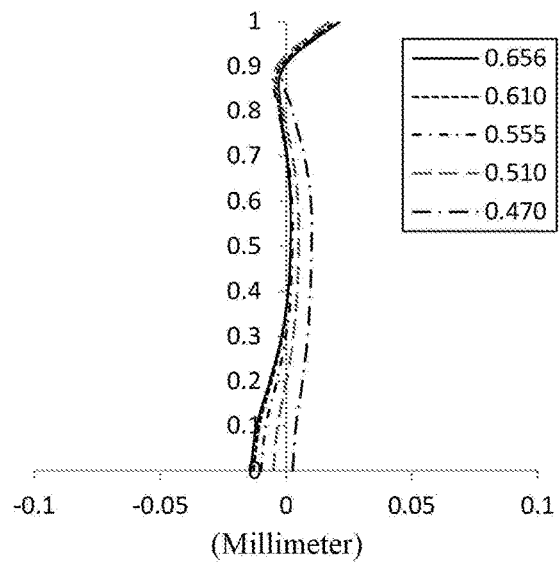
FIGS. 4A to 4C illustrate a longitudinal aberration curve, an astigmatic curve, and a lateral color curve of the optical imaging system of the example 2, respectively.
Figure 4B:
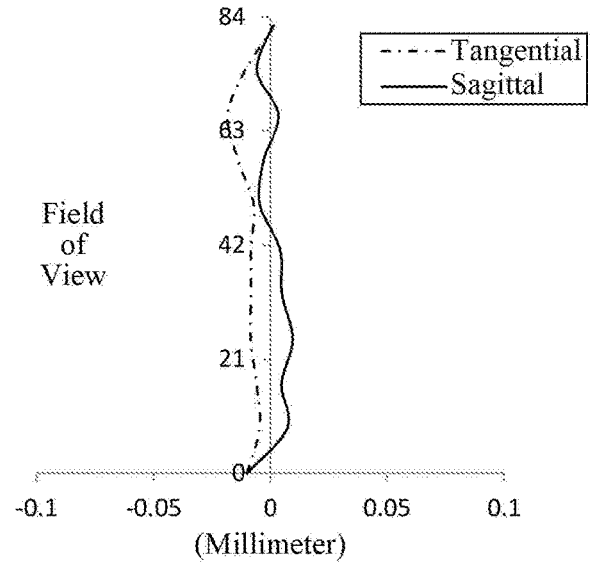
Figure 4C:
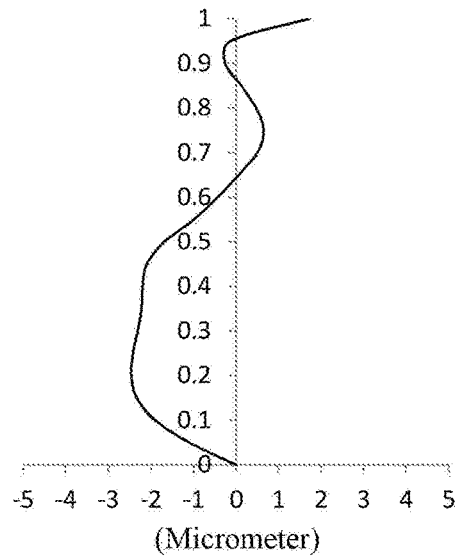

FIG. 4A illustrates a longitudinal aberration curve of the optical imaging system according to example 2, representing deviations of focal points converged by light of different wavelengths after passing through the system. FIG. 4B illustrates an astigmatic curve of the optical imaging system according to example 2, representing a curvature of a tangential plane and a curvature of a sagittal plane. FIG. 4C illustrates a lateral color curve of the optical imaging system according to example 2, representing deviations of different image heights on an imaging plane after light passes through the system. It can be seen from FIG. 4A to FIG. 4C that the optical imaging system provided in example 2 may achieve good image quality.

Example 3

An optical imaging system according to example 3 of the present disclosure is described below with reference to FIG.

Figure 6C:
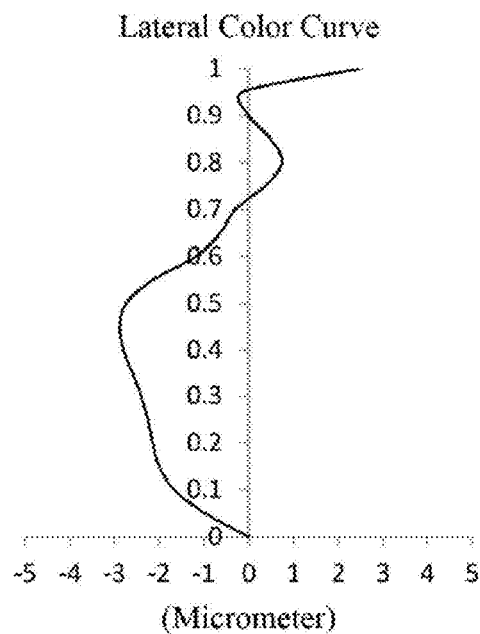

5 to FIG. 6C. FIG. 5 shows a schematic structural view of the optical imaging system according to example 3 of the present disclosure.

As shown in FIG. 5, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 3, a total effective focal length f of the optical imaging system is 1.96 mm, an aperture number Fno of the optical imaging system is 1.69, an on-axis distance TTL from the object-side surface S1 of the first lens E1 to the imaging plane S17 is 6.42 mm, half of a diagonal length ImgH of an effective pixel area on the imaging plane S17 is 3.05 mm, and half of a maximal field-of-view Semi-FOV is 79.0°.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 400.0000 | | | | |
| S1 | Aspheric | −4.3964 | 0.4631 | 1.55 | 56.1 | −3.98 | −48.8831 |
| S2 | Aspheric | 4.4466 | 1.0129 | | | | −25.8389 |
| STO | Spherical | Infinite | −0.0363 | | | | |
| S3 | Aspheric | 4.6075 | 1.0635 | 1.55 | 56.1 | 1.89 | 26.1063 |
| S4 | Aspheric | −1.2227 | 0.0500 | | | | −1.4799 |
| S5 | Aspheric | −10.1660 | 0.2502 | 1.68 | 19.2 | −122.33 | 83.2690 |
| S6 | Aspheric | −11.7023 | 0.0350 | | | | 87.6300 |
| S7 | Aspheric | 7.2290 | 0.2300 | 1.67 | 20.4 | −3.44 | 26.2456 |
| S8 | Aspheric | 1.7203 | 0.1168 | | | | −18.5421 |
| S9 | Aspheric | 5.6625 | 0.8846 | 1.55 | 56.1 | 11.30 | 11.7006 |
| S10 | Aspheric | 65.3421 | 0.2227 | | | | −90.0000 |
| S11 | Aspheric | 2.4056 | 0.5565 | 1.55 | 56.1 | 3.54 | −4.2697 |
| S12 | Aspheric | −8.9801 | 0.3339 | | | | −40.1906 |
| S13 | Aspheric | 1.1947 | 0.4000 | 1.64 | 56.1 | −5.51 | −7.9052 |
| S14 | Aspheric | 0.7767 | 0.4003 | | | | −3.3030 |
| S15 | Spherical | Infinite | 0.1100 | 1.62 | 64.2 | | |
| S16 | Spherical | Infinite | 0.3222 | | | | |
| S17 | Spherical | Infinite | | | | | |

TABLE 6

| Surface number | A4 | A6 | A8 | A10 | A12 |
|---|---|---|---|---|---|
| S1 | 4.9559E−01 | −9.4409E−02 | 1.4034E−02 | −4.0000E−03 | 1.5870E−03 |
| S2 | 2.9320E−01 | −1.4939E−03 | 3.1698E−03 | 3.4443E−05 | 4.2948E−05 |
| S3 | −3.8422E−02 | −5.0907E−03 | −8.1034E−04 | −1.5765E−04 | −3.1008E−05 |
| S4 | −1.4793E−02 | −1.1056E−02 | 1.7892E−03 | −8.0196E−04 | 2.9345E−04 |
| S5 | −9.5978E−03 | −2.4235E−03 | 7.4883E−03 | −7.4914E−03 | 2.7485E−04 |
| S6 | −3.1479E−03 | −4.0740E−03 | 9.4367E−03 | −6.8135E−05 | 1.0207E−04 |
| S7 | −1.1924E−01 | 9.0272E−03 | 3.6452E−03 | 2.0660E−04 | −3.9758E−04 |
| S8 | 1.4248E−02 | −9.8462E−03 | 1.7981E−03 | −1.7093E−03 | 1.4705E−04 |
| S9 | −1.6836E−02 | −3.9648E−03 | 1.4472E−03 | 6.9227E−04 | −7.5512E−05 |
| S10 | −4.2833E−01 | 5.1636E−02 | 7.7022E−03 | 4.8244E−03 | 3.6766E−03 |
| S11 | −5.0598E−01 | −6.2485E−02 | 8.4293E−03 | −9.7002E−04 | 4.1917E−03 |
| S12 | −1.1098E−01 | −4.0722E−02 | 1.4776E−02 | 2.5360E−04 | −3.4801E−04 |
| S13 | −1.4397E+00 | 3.0786E−01 | 2.0732E−04 | −5.2548E−03 | −6.2031E−03 |
| S14 | −1.3172E+00 | 2.3704E−01 | −8.0231E−02 | 3.2362E−02 | −7.7553E−03 |

TABLE 6-continued

| Surface number | A14 | A16 | A18 | A20 |
|---|---|---|---|---|
| S1 | −3.7246E−04 | 9.2426E−05 | −3.1859E−05 | 6.5656E−06 |
| S2 | 9.5461E−05 | −5.6197E−06 | 2.8364E−05 | −1.6985E−06 |
| S3 | −1.3026E−05 | −9.6888E−06 | −2.1428E−06 | −3.1395E−06 |
| S4 | −1.3102E−04 | 4.3997E−05 | −9.2394E−06 | 6.4676E−07 |
| S5 | −3.2233E−04 | 1.2275E−04 | −1.0507E−05 | 2.5695E−06 |
| S6 | −3.2904E−04 | 4.3731E−05 | 1.5510E−05 | −3.4389E−06 |
| S7 | −1.4937E−04 | 4.3867E−05 | 2.5233E−05 | −9.8676E−06 |
| S8 | −1.8161E−04 | 5.5324E−05 | −3.4733E−05 | 7.6043E−06 |
| S9 | −4.0569E−05 | −1.1912E−05 | −1.9681E−06 | 2.1420E−06 |
| S10 | 1.0549E−03 | 3.4375E−04 | 7.7378E−05 | 6.6220E−06 |
| S11 | 2.3446E−03 | −2.4846E−04 | −3.9279E−04 | −3.6509E−05 |
| S12 | 1.4238E−03 | −3.6551E−03 | 4.5194E−04 | 2.1249E−04 |
| S13 | −1.0101E−03 | 6.9110E−06 | −3.3527E−04 | 3.7215E−04 |
| S14 | 3.4215E−03 | −1.3877E−03 | 3.4036E−04 | −4.8577E−05 |

FIG. 6A illustrates a longitudinal aberration curve of the optical imaging system according to example 3, representing deviations of focal points converged by light of different wavelengths after passing through the system. FIG. 6B illustrates an astigmatic curve of the optical imaging system according to example 3, representing a curvature of a tangential plane and a curvature of a sagittal plane. FIG. 6C illustrates a lateral color curve of the optical imaging system according to example 3, representing deviations of different image heights on an imaging plane after light passes through the system. It can be seen from FIG. 6A to FIG. 6C that the optical imaging system provided in example 3 may achieve good image quality.

Example 4

Figure 7:
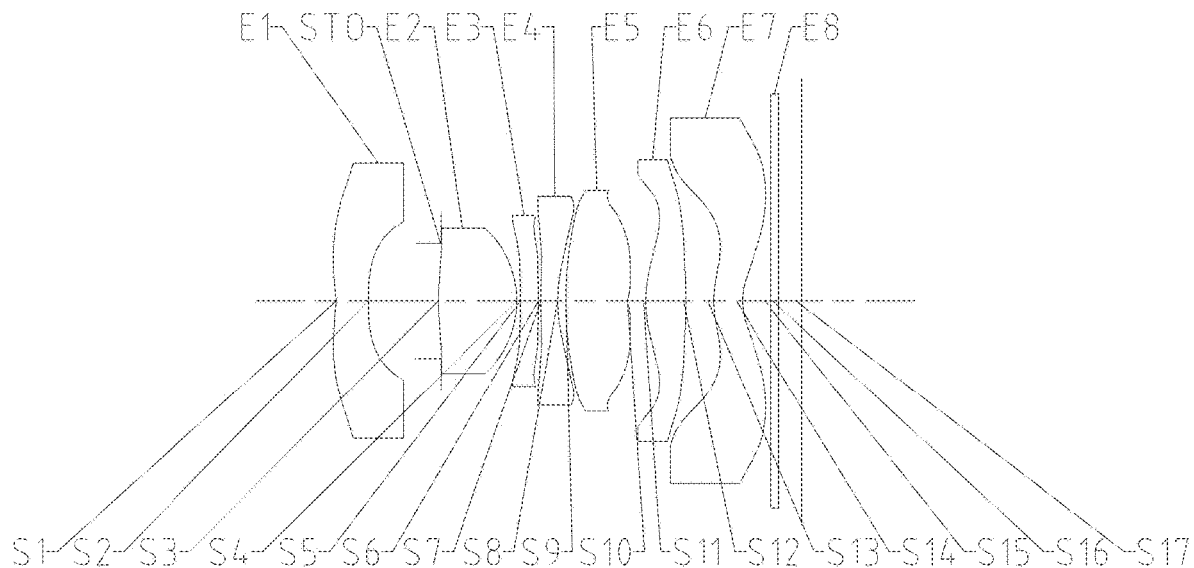
FIG. 7 illustrates a schematic structural view of an optical imaging system according to example 4 of the present disclosure.

An optical imaging system according to example 4 of the present disclosure is described below with reference to FIG. 7 to FIG. 8C. FIG. 7 shows a schematic structural view of the optical imaging system according to example 4 of the present disclosure.

As shown in FIG. 7, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 4, a total effective focal length f of the optical imaging system is 1.95 mm, an aperture number Fno of the optical imaging system is 1.70, an on-axis distance TTL from the object-side surface S1 of the first lens E1 to the imaging plane S17 is 6.49 mm, half of a diagonal length ImgH of an effective pixel area on the imaging plane S17 is 3.05 mm, and half of a maximal field-of-view Semi-FOV is 77.6°.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| S1 | Aspheric | −4.3964 | 0.4631 | 1.55 | 56.1 | −3.98 | −48.8831 |
| S2 | Aspheric | 4.4466 | 1.0129 | | | | −24.6940 |
| STO | Spherical | Infinite | −0.0386 | | | | |
| S3 | Aspheric | 4.6075 | 1.0945 | 1.55 | 56.1 | 1.90 | 26.1063 |
| S4 | Aspheric | −1.2256 | 0.0500 | | | | −1.4943 |
| S5 | Aspheric | −10.1942 | 0.2500 | 1.68 | 19.2 | −200.00 | 82.3163 |
| S6 | Aspheric | −11.1326 | 0.0350 | | | | 86.8770 |
| S7 | Aspheric | 7.9902 | 0.2300 | 1.67 | 20.4 | −3.41 | 26.4324 |
| S8 | Aspheric | 1.7519 | 0.1168 | | | | −17.4437 |
| S9 | Aspheric | 5.8041 | 0.8846 | 1.55 | 56.1 | −108.11 | 11.5983 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S10 | Aspheric | 5.0000 | 0.2227 | | | | −89.3859 |
| S11 | Aspheric | 1.6656 | 0.5565 | 1.55 | 56.1 | 2.61 | −5.4591 |
| S12 | Aspheric | −8.6457 | 0.3848 | | | | −19.3755 |
| S13 | Aspheric | 1.2078 | 0.4000 | 1.64 | 56.1 | −5.45 | −8.2273 |
| S14 | Aspheric | 0.7822 | 0.3988 | | | | −3.4089 |
| S15 | Spherical | Infinite | 0.1100 | 1.62 | 64.2 | | |
| S16 | Spherical | Infinite | 0.3207 | | | | |
| S17 | Spherical | Infinite | | | | | |

TABLE 8

| Surface number | A4 | A6 | A8 | A10 | A12 |
|---|---|---|---|---|---|
| S1 | 4.9170E−01 | −9.4622E−02 | 1.3675E−02 | −3.6720E−03 | 1.6128E−03 |
| S2 | 2.9135E−01 | −2.4624E−03 | 2.8951E−03 | −8.3071E−05 | 7.3135E−05 |
| S3 | −3.6524E−02 | −4.9515E−03 | −8.3859E−04 | −1.5765E−04 | −4.6550E−05 |
| S4 | −1.4447E−02 | −1.1249E−02 | 2.2266E−03 | −9.9907E−04 | 3.5901E−04 |
| S5 | −2.2905E−02 | −5.7246E−03 | 8.5842E−03 | −1.2203E−03 | 3.7272E−04 |
| S6 | −7.5618E−03 | −5.3002E−03 | 9.5212E−03 | −7.0716E−05 | 5.6805E−05 |
| S7 | −1.1857E−01 | 9.7179E−03 | 3.3313E−03 | 2.3635E−04 | −3.2078E−04 |
| S8 | 1.1699E−02 | −8.9390E−03 | 1.9546E−03 | −1.4924E−03 | 2.9177E−04 |
| S9 | −1.4979E−02 | −3.6692E−03 | 1.2766E−03 | 7.7352E−04 | −1.1699E−04 |
| S10 | −5.0351E−01 | 6.2196E−02 | −1.9921E−03 | 4.4512E−03 | 1.5626E−03 |
| S11 | −4.9414E−01 | −4.9746E−02 | 4.2279E−03 | 9.9522E−03 | 2.8729E−03 |
| S12 | −4.9909E−02 | −3.0220E−02 | 1.5141E−02 | 1.2042E−03 | −2.4675E−04 |
| S13 | −1.4346E+00 | 3.0819E−01 | 3.6116E−03 | −2.3629E−03 | −7.5139E−03 |
| S14 | −1.3252E+00 | 2.3658E−01 | −8.7312E−02 | 3.2027E−02 | −7.9054E−03 |

| Surface number | A14 | A16 | A18 | A20 |
|---|---|---|---|---|
| S1 | −3.6274E−04 | 8.0280E−05 | −3.3956E−05 | 6.1591E−06 |
| S2 | 8.4243E−05 | 6.4205E−06 | 2.2746E−05 | 2.5386E−06 |
| S3 | −1.3026E−05 | −9.6888E−06 | −2.1428E−06 | −3.1395E−06 |
| S4 | −1.4005E−04 | 4.3313E−05 | −9.1319E−06 | 7.5207E−07 |
| S5 | −3.5561E−04 | 1.2257E−04 | −8.7592E−06 | 4.3086E−06 |
| S6 | −2.8524E−04 | 2.7169E−05 | 1.5409E−05 | −1.9026E−06 |
| S7 | −1.7053E−04 | 4.8843E−05 | 1.8046E−05 | −7.0029E−06 |
| S8 | −2.1042E−04 | 7.8208E−05 | −3.4760E−05 | 6.2030E−06 |
| S9 | −1.3047E−05 | −1.0638E−05 | −1.1573E−06 | 1.4840E−06 |
| S10 | 9.1070E−04 | 7.3151E−05 | 1.1786E−04 | −1.3480E−05 |
| S11 | 3.0528E−03 | −3.7499E−04 | −2.5275E−04 | −3.5319E−05 |
| S12 | 1.6489E−03 | −3.3610E−03 | 6.0160E−04 | 3.1834E−04 |
| S13 | −1.6751E−03 | 7.0025E−04 | −2.7073E−04 | 3.6373E−04 |
| S14 | 3.9914E−03 | −1.0494E−03 | 2.9261E−04 | −1.0087E−04 |

Figure 8A:
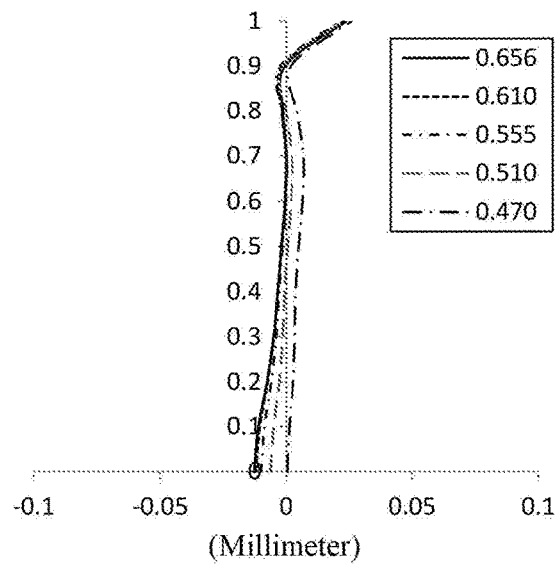
FIGS. 8A to 8C illustrate a longitudinal aberration curve, an astigmatic curve, and a lateral color curve of the optical imaging system of the example 4, respectively.
Figure 8B:
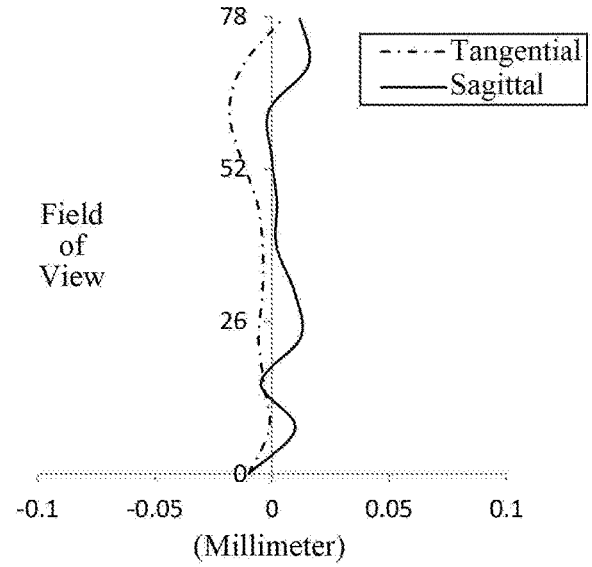
Figure 8C:
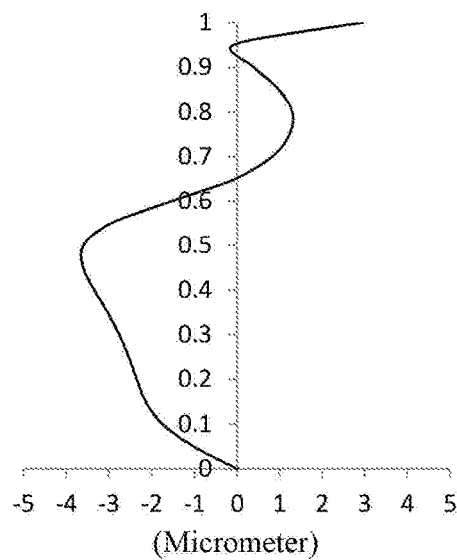

FIG. 8A illustrates a longitudinal aberration curve of the optical imaging system according to example 4, representing deviations of focal points converged by light of different wavelengths after passing through the system. FIG. 8B illustrates an astigmatic curve of the optical imaging system according to example 4, representing a curvature of a tangential plane and a curvature of a sagittal plane. FIG. 8C illustrates a lateral color curve of the optical imaging system according to example 4, representing deviations of different image heights on an imaging plane after light passes through the system. It can be seen from FIG. 8A to FIG. 8C that the optical imaging system provided in example 4 may achieve good image quality.

Example 5

Figure 9:
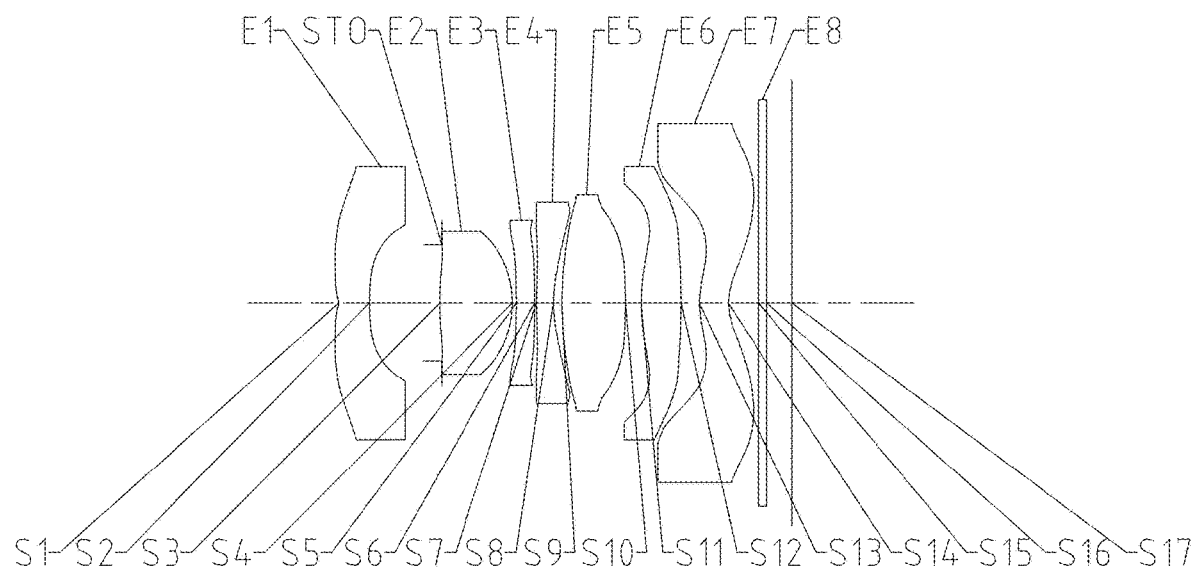
FIG. 9 illustrates a schematic structural view of an optical imaging system according to example 5 of the present disclosure.

An optical imaging system according to example 5 of the present disclosure is described below with reference to FIG. 9 to FIG. 10C. FIG. 9 shows a schematic structural view of the optical imaging system according to example 5 of the present disclosure.

As shown in FIG. 9, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has positive refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 5, a total effective focal length f of the optical imaging system is 1.97 mm, an aperture number Fno of the optical imaging system is 1.70, an on-axis distance TTL from the object-side surface S1 of the first lens E1 to the imaging plane S17 is 6.34 mm, half of a diagonal length ImgH of an effective pixel area on the imaging plane S17 is 3.05 mm, and half of a maximal field-of-view Semi-FOV is 80.5°.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| S1 | Aspheric | −4.4396 | 0.4607 | 1.55 | 56.1 | −3.96 | −48.8831 |
| S2 | Aspheric | 4.3598 | 1.0079 | | | | −16.2570 |
| STO | Spherical | Infinite | −0.0309 | | | | |
| S3 | Aspheric | 4.5846 | 1.0166 | 1.55 | 56.1 | 1.91 | 26.1063 |
| S4 | Aspheric | −1.2451 | 0.0500 | | | | −1.4040 |
| S5 | Aspheric | −11.5193 | 0.2546 | 1.68 | 19.2 | 180.00 | 89.8767 |
| S6 | Aspheric | −10.6192 | 0.0350 | | | | 81.6186 |
| S7 | Aspheric | 10.2984 | 0.2300 | 1.67 | 20.4 | −3.39 | 57.0269 |
| S8 | Aspheric | 1.8390 | 0.1162 | | | | −17.4526 |
| S9 | Aspheric | 6.1550 | 0.8802 | 1.55 | 56.1 | 7.99 | 10.2660 |
| S10 | Aspheric | −14.2121 | 0.2216 | | | | 89.6265 |
| S11 | Aspheric | 2.8685 | 0.5537 | 1.55 | 56.1 | 4.12 | −3.8181 |
| S12 | Aspheric | −9.6723 | 0.2537 | | | | 9.6846 |
| S13 | Aspheric | 1.1118 | 0.4000 | 1.64 | 56.1 | −5.36 | −6.9172 |
| S14 | Aspheric | 0.7224 | 0.4309 | | | | −3.3397 |
| S15 | Spherical | Infinite | 0.1100 | 1.62 | 64.2 | | |
| S16 | Spherical | Infinite | 0.3528 | | | | |
| S17 | Spherical | Infinite | | | | | |

TABLE 10

| Surface number | A4 | A6 | A8 | A10 | A12 |
|---|---|---|---|---|---|
| S1 | 5.6067E−01 | −1.1635E−01 | 1.7168E−02 | −4.6445E−03 | 2.1767E−03 |
| S2 | 3.0711E−01 | −9.5244E−04 | 3.0149E−03 | −1.2173E−04 | 4.7125E−05 |
| S3 | 4.2045E−02 | −5.8550E−03 | −1.0215E−03 | −1.6166E−04 | −4.9678E−05 |
| S4 | −3.6197E−02 | −1.5591E−02 | 2.1553E−03 | −1.3992E−03 | 5.0386E−04 |
| S5 | −3.0020E−02 | −6.4842E−04 | 1.1598E−02 | −1.9814E−03 | 4.2709E−04 |
| S6 | 1.5999E−02 | 2.5960E−03 | 1.9985E−02 | −2.2259E−03 | 4.7339E−04 |
| S7 | −1.1688E−01 | 1.6822E−02 | 4.2959E−03 | −4.1409E−03 | −6.6816E−04 |
| S8 | 7.3989E−03 | −1.3988E−02 | −5.3138E−03 | −4.2454E−03 | −6.2950E−04 |
| S9 | 5.4458E−04 | −8.5128E−03 | 6.9130E−03 | −1.8274E−03 | 1.3796E−04 |
| S10 | −3.3210E−01 | 3.8816E−02 | 1.0229E−02 | 3.5535E−03 | 3.9503E−03 |
| S11 | −5.2412E−01 | −6.1840E−02 | 2.0916E−02 | −5.1761E−03 | 2.3687E−03 |
| S12 | −1.6150E−01 | −2.4327E−02 | 2.7840E−02 | −5.5781E−03 | −2.1012E−03 |
| S13 | −1.4956E+00 | 3.3243E−01 | −3.1787E−03 | −3.3867E−03 | −1.0815E−02 |
| S14 | −1.4013E+00 | 2.5688E−01 | −7.9976E−02 | 4.1430E−02 | −1.2566E−02 |

| Surface number | A14 | A16 | A18 | A20 |
|---|---|---|---|---|
| S1 | −5.7817E−04 | 1.4473E−04 | −5.9501E−05 | 1.3598E−05 |
| S2 | 9.4750E−05 | −3.3483E−06 | 2.6356E−05 | −7.0911E−06 |
| S3 | −1.3956E−05 | −1.0167E−05 | −2.3793E−06 | −3.2212E−06 |
| S4 | −2.4552E−04 | 8.2932E−05 | −2.6538E−05 | 3.1176E−06 |
| S5 | −5.2637E−04 | 1.9187E−04 | −1.0015E−05 | 2.7983E−06 |
| S6 | −7.3371E−04 | 1.3881E−04 | 5.6060E−05 | −1.3990E−05 |
| S7 | −8.2320E−04 | 1.5595E−04 | −1.5299E−04 | −8.7570E−05 |
| S8 | −9.9692E−04 | 3.9495E−05 | −1.4550E−04 | 2.1918E−05 |

TABLE 10-continued

| | | | | |
|---|---|---|---|---|
| S9 | −6.9760E−04 | 9.4094E−06 | −8.1745E−05 | 5.8839E−07 |
| S10 | 8.5523E−04 | 4.2081E−04 | 1.1743E−04 | 3.5553E−05 |
| S11 | 1.6241E−03 | 1.7850E−04 | −1.3383E−04 | 1.3292E−04 |
| S12 | 5.9534E−03 | −2.7926E−03 | 7.5321E−04 | −7.0497E−05 |
| S13 | 5.3505E−03 | 5.5741E−04 | −1.1081E−03 | 1.9244E−04 |
| S14 | 6.2677E−03 | −2.5515E−03 | 7.9495E−04 | −2.8551E−04 |

Figures 10A, 10B:
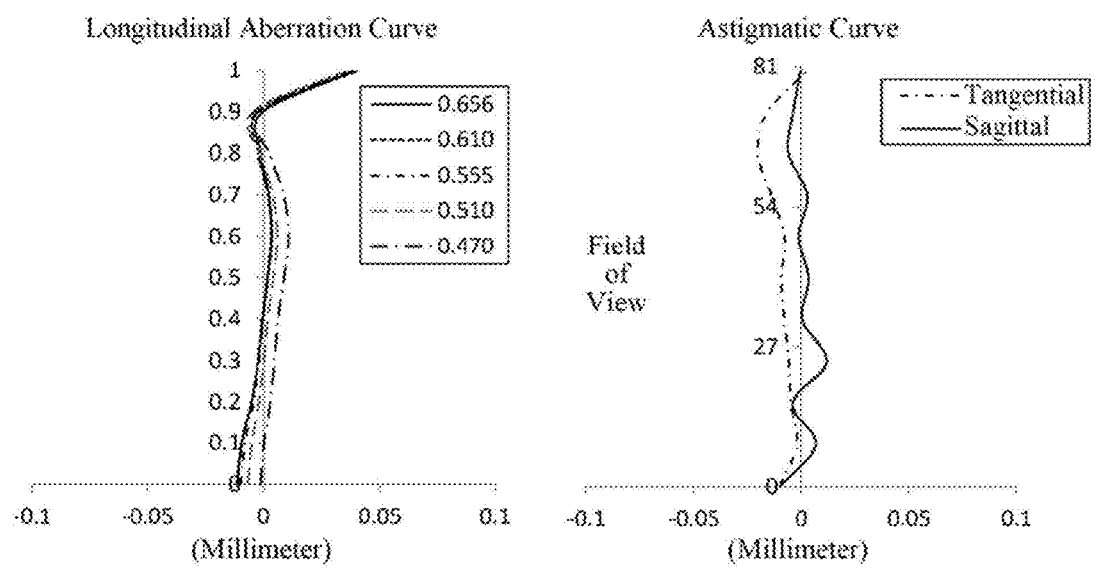
FIGS. 10A to 10C illustrate a longitudinal aberration curve, an astigmatic curve, and a lateral color curve of the optical imaging system of the example 5, respectively.
Figure 10C:
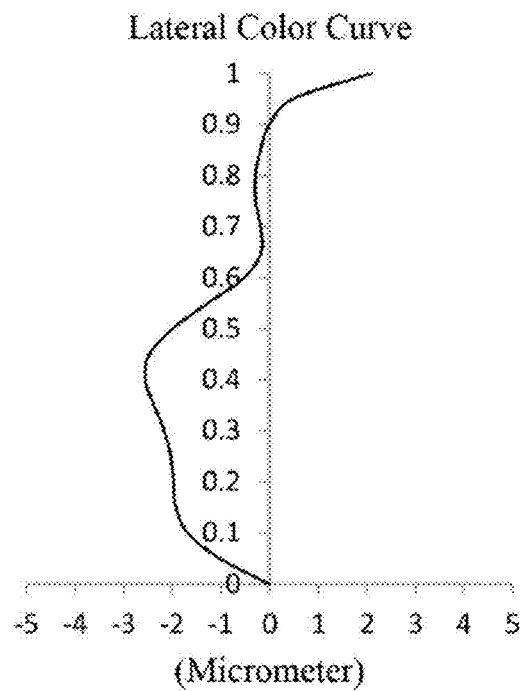

FIG. 10A illustrates a longitudinal aberration curve of the optical imaging system according to example 5, representing deviations of focal points converged by light of different wavelengths after passing through the system. FIG. 10B illustrates an astigmatic curve of the optical imaging system according to example 5, representing a curvature of a tangential plane and a curvature of a sagittal plane. FIG. 10C illustrates a lateral color curve of the optical imaging system according to example 5, representing deviations of different image heights on an imaging plane after light passes through the system. It can be seen from FIG. 10A to FIG. 10C that the optical imaging system provided in example 5 may achieve good image quality.

Example 6

Figure 11:
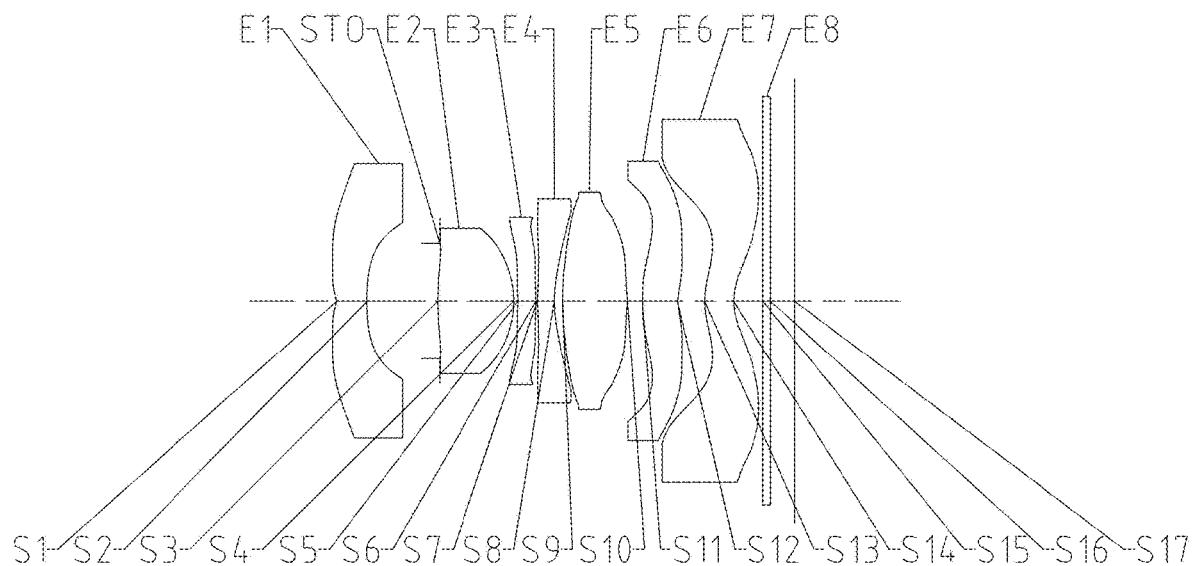
FIG. 11 illustrates a schematic structural view of an optical imaging system according to example 6 of the present disclosure.

An optical imaging system according to example 6 of the present disclosure is described below with reference to FIG. 11 to FIG. 12C. FIG. 11 shows a schematic structural view of the optical imaging system according to example 6 of the present disclosure.

As shown in FIG. 11, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 6, a total effective focal length f of the optical imaging system is 1.98 mm, an aperture number Fno of the optical imaging system is 1.70, an on-axis distance TTL from the object-side surface S1 of the first lens E1 to the imaging plane S17 is 6.42 mm, half of a diagonal length ImgH of an effective pixel area on the imaging plane S17 is 3.07 mm, and half of a maximal field-of-view Semi-FOV is 78.5°.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | 400.0000 | | | | |
| S1 | Aspheric | −4.4832 | 0.4631 | 1.55 | 56.1 | −3.98 | −48.8831 |
| S2 | Aspheric | 4.3612 | 1.0129 | | | | −39.4747 |
| STO | Spherical | Infinite | −0.0266 | | | | |
| S3 | Aspheric | 4.6075 | 1.0634 | 1.55 | 56.1 | 1.89 | 26.1063 |
| S4 | Aspheric | −1.2199 | 0.0500 | | | | −1.5424 |
| S5 | Aspheric | −10.4709 | 0.2500 | 1.68 | 19.2 | −118.18 | 88.9903 |
| S6 | Aspheric | −12.1622 | 0.0350 | | | | 90.0000 |
| S7 | Aspheric | 9.8620 | 0.2250 | 1.67 | 20.4 | −3.41 | 48.4458 |
| S8 | Aspheric | 1.8320 | 0.1168 | | | | −16.5809 |
| S9 | Aspheric | 5.8761 | 0.8846 | 1.55 | 56.1 | 7.76 | 9.8780 |
| S10 | Aspheric | −14.3993 | 0.2227 | | | | 89.3071 |
| S11 | Aspheric | 2.6854 | 0.5565 | 1.55 | 56.1 | 5.05 | −3.0633 |
| S12 | Aspheric | 99.0000 | 0.3077 | | | | 90.0000 |
| S13 | Aspheric | 1.0226 | 0.4000 | 1.64 | 56.1 | −7.69 | −5.8720 |
| S14 | Aspheric | 0.7178 | 0.4142 | | | | −3.1208 |
| S15 | Spherical | Infinite | 0.1100 | 1.62 | 64.2 | | |
| S16 | Spherical | Infinite | 0.3361 | | | | |
| S17 | Spherical | Infinite | | | | | |

TABLE 12

| Surface number | A4 | A6 | A8 | A10 | A12 |
|---|---|---|---|---|---|
| S1 | 5.4891E−01 | −1.0738E−01 | 1.6424E−02 | −4.8712E−03 | 2.0229E−03 |
| S2 | 3.1466E−01 | −2.8263E−03 | 3.5314E−03 | −1.8167E−04 | 1.8540E−05 |
| S3 | −4.1785E−02 | −5.8539E−03 | −1.0277E−03 | −1.8282E−03 | −5.2210E−05 |
| S4 | −3.8254E−02 | −1.9001E−02 | 2.9687E−03 | −1.8024E−03 | 6.5313E−04 |
| S5 | −2.7290E−02 | −3.6993E−03 | 1.4044E−02 | −1.7994E−03 | 7.9083E−04 |
| S6 | −5.8998E−03 | 1.2785E−03 | 2.1758E−02 | −3.3143E−03 | 8.4457E−04 |
| S7 | −1.1896E−01 | 1.8898E−02 | 4.8164E−03 | −3.7819E−03 | 4.9831E−04 |
| S8 | 1.1253E−02 | −7.8454E−03 | −3.0804E−03 | −2.9907E−03 | 1.5999E−04 |
| S9 | −6.8539E−03 | −8.9735E−03 | 7.5201E−03 | −1.1912E−03 | 6.6737E−04 |
| S10 | −3.1298E−01 | 3.3932E−02 | 1.0588E−02 | 2.5579E−03 | 4.4133E−03 |
| S11 | −4.8121E−01 | −6.8147E−02 | 1.6194E−02 | −6.0683E−03 | 2.1199E−03 |
| S12 | −3.0742E−01 | −1.3759E−02 | 1.3594E−02 | −1.8078E−03 | −4.0984E−03 |
| S13 | −1.5556E+00 | 3.3264E−01 | −7.7589E−03 | −2.8075E−03 | −8.6348E−03 |
| S14 | −1.6292E+00 | 3.3246E−01 | −9.4786E−02 | 5.4738E−02 | −1.5896E−02 |

| Surface number | A14 | A16 | A18 | A20 |
|---|---|---|---|---|
| S1 | −5.3189E−04 | 1.5290E−04 | −5.7767E−05 | 1.2283E−05 |
| S2 | 6.7907E−05 | −1.5328E−05 | 2.5384E−05 | −7.0298E−06 |
| S3 | −1.8432E−05 | −1.2530E−05 | −3.4565E−06 | −3.6375E−06 |
| S4 | −3.3060E−04 | 1.1409E−04 | −4.2539E−05 | 7.2466E−06 |
| S5 | −6.2475E−04 | 2.3812E−04 | −5.5041E−06 | 2.7222E−05 |
| S6 | −1.0242E−03 | 9.2747E−05 | 5.2606E−05 | −5.2555E−06 |
| S7 | −8.8747E−04 | 2.0330E−04 | −1.0887E−05 | −5.2921E−05 |
| S8 | −8.3239E−04 | 1.5106E−04 | −1.1710E−04 | 2.7304E−05 |
| S9 | −6.2349E−04 | 1.4305E−04 | −7.5386E−05 | 1.9243E−05 |
| S10 | 7.9872E−04 | 4.3808E−04 | 1.3148E−04 | 4.2643E−05 |
| S11 | 1.4660E−03 | −3.0995E−05 | −1.5708E−04 | 8.7665E−05 |
| S12 | 5.7376E−03 | −2.8717E−03 | 9.2347E−04 | −1.5257E−04 |
| S13 | 3.7659E−03 | 1.2150E−03 | −1.2527E−03 | 2.3787E−04 |
| S14 | 7.8387E−03 | −3.5081E−03 | 4.8957E−04 | −4.8793E−04 |

Figure 12A:
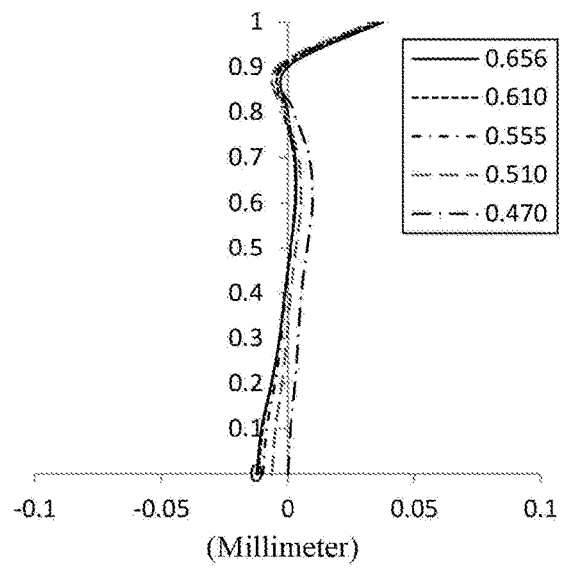
FIGS. 12A to 12C illustrate a longitudinal aberration curve, an astigmatic curve, and a lateral color curve of the optical imaging system of the example 6, respectively.
Figure 12B:
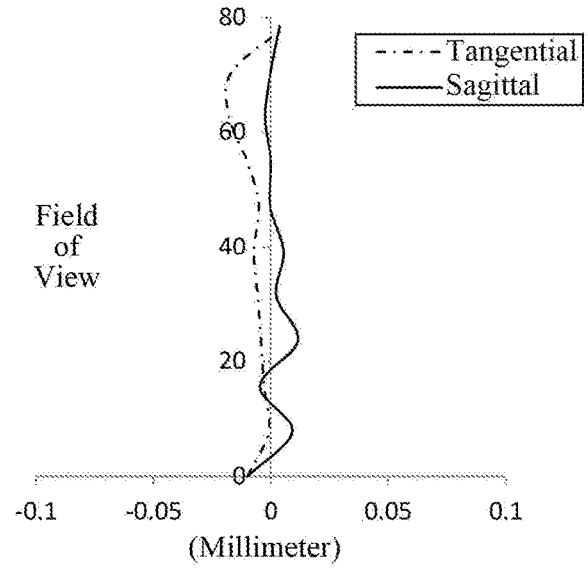
Figure 12C:
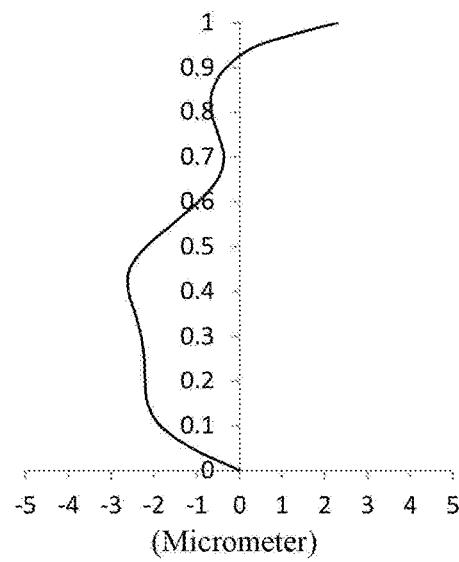

FIG. 12A illustrates a longitudinal aberration curve of the optical imaging system according to example 6, representing deviations of focal points converged by light of different wavelengths after passing through the system. FIG. 12B illustrates an astigmatic curve of the optical imaging system according to example 6, representing a curvature of a tangential plane and a curvature of a sagittal plane. FIG. 12C illustrates a lateral color curve of the optical imaging system according to example 6, representing deviations of different image heights on an imaging plane after light passes through the system. It can be seen from FIG. 12A to FIG. 12C that the optical imaging system provided in example 6 may achieve good image quality.

Example 7

Figure 13:
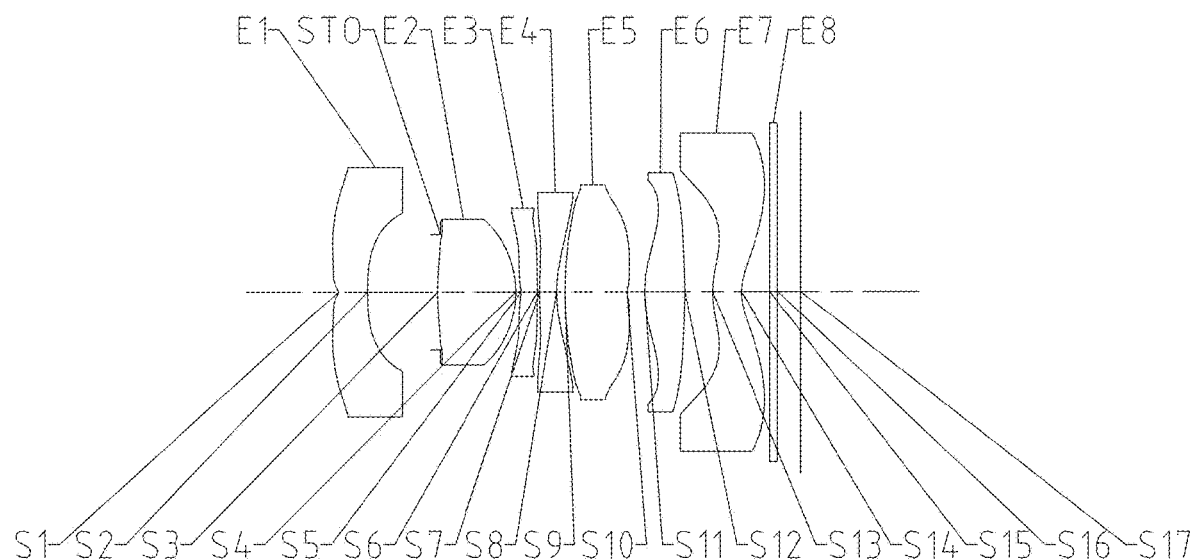
FIG. 13 illustrates a schematic structural view of an optical imaging system according to example 7 of the present disclosure.

An optical imaging system according to example 7 of the present disclosure is described below with reference to FIG. 13 to FIG. 14C. FIG. 13 shows a schematic structural view of the optical imaging system according to example 7 of the present disclosure.

As shown in FIG. 13, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 7, a total effective focal length f of the optical imaging system is 1.95 mm, an aperture number Fno of the optical imaging system is 1.70, an on-axis distance TTL from the object-side surface S1 of the first lens E1 to the imaging plane S17 is 6.49 mm, half of a diagonal length ImgH of an effective pixel area on the imaging plane S17 is 2.45 mm, and half of a maximal field-of-view Semi-FOV is 55.2°.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| S1 | Aspheric | −4.3964 | 0.4631 | 1.55 | 56.1 | −3.98 | −48.8831 |
| S2 | Aspheric | 4.4466 | 1.0129 | | | | −24.6940 |
| STO | Spherical | Infinite | −0.0386 | | | | |
| S3 | Aspheric | 4.6075 | 1.0945 | 1.55 | 56.1 | 1.90 | 26.1063 |
| S4 | Aspheric | −1.2256 | 0.0500 | | | | −1.4943 |
| S5 | Aspheric | −10.1942 | 0.2500 | 1.68 | 19.2 | −200.00 | 82.3163 |
| S6 | Aspheric | −11.1326 | 0.0350 | | | | 86.8770 |
| S7 | Aspheric | 7.9902 | 0.2300 | 1.67 | 20.4 | −3.41 | 26.4324 |
| S8 | Aspheric | 1.7519 | 0.1168 | | | | −17.4437 |
| S9 | Aspheric | 5.8041 | 0.8846 | 1.55 | 56.1 | −108.11 | 11.5983 |
| S10 | Aspheric | 5.0000 | 0.2227 | | | | −89.3859 |
| S11 | Aspheric | 1.6656 | 0.5565 | 1.55 | 56.1 | 2.61 | −5.4591 |
| S12 | Aspheric | −8.6457 | 0.3848 | | | | −19.3755 |
| S13 | Aspheric | 1.2078 | 0.4000 | 1.64 | 56.1 | −5.45 | −8.2273 |
| S14 | Aspheric | 0.7822 | 0.3988 | | | | −3.4089 |
| S15 | Spherical | Infinite | 0.1100 | 1.62 | 64.2 | | |
| S16 | Spherical | Infinite | 0.3207 | | | | |
| S17 | Spherical | Infinite | | | | | |

TABLE 14

| Surface number | A4 | A6 | A8 | A10 | A12 |
|---|---|---|---|---|---|
| S1 | 5.4891E−01 | −1.0738E−01 | 1.6424E−02 | −4.8712E−03 | 2.0229E−03 |
| S2 | 3.1466E−01 | −2.8263E−03 | 3.5314E−03 | −1.8167E−04 | 1.8540E−05 |
| S3 | −4.1785E−02 | −5.8539E−03 | −1.0277E−03 | −1.8282E−04 | −5.2210E−05 |
| S4 | −3.8254E−02 | −1.9001E−02 | 2.9687E−03 | −1.8024E−03 | 6.5313E−04 |
| S5 | −2.7290E−02 | −3.6993E−03 | 1.4044E−02 | −1.7994E−03 | 7.9083E−04 |
| S6 | −5.8998E−03 | 1.2785E−03 | 2.1758E−02 | −3.3143E−03 | 8.4457E−04 |
| S7 | −1.1896E−01 | 1.8898E−02 | 4.8164E−03 | −3.7819E−03 | 4.9831E−04 |
| S8 | 1.1253E−02 | −7.8454E−03 | −3.0804E−03 | −2.9907E−03 | 1.5999E−04 |
| S9 | −6.8539E−03 | −8.9735E−03 | 7.5201E−03 | −1.1912E−03 | 6.6737E−04 |
| S10 | −3.1298E−01 | 3.3932E−02 | 1.0588E−02 | 2.5579E−03 | 4.4133E−03 |
| S11 | −4.8121E−01 | −6.8147E−02 | 1.6194E−02 | −6.0683E−03 | 2.1199E−03 |
| S12 | −3.0742E−01 | −1.3759E−02 | 1.3594E−02 | −1.8078E−03 | −4.0984E−03 |
| S13 | −1.5556E+00 | 3.3264E−01 | −7.7589E−03 | −2.8075E−03 | −8.6348E−03 |
| S14 | −1.6292E+00 | 3.3246E−01 | −9.4786E−02 | 5.4738E−02 | −1.5896E−02 |

| Surface number | A14 | A16 | A18 | A20 |
|---|---|---|---|---|
| S1 | −5.3189E−04 | 1.5290E−04 | −5.7767E−05 | 1.2283E−05 |
| S2 | 6.7907E−05 | −1.5328E−05 | 2.5384E−05 | −7.0298E−06 |
| S3 | −1.8432E−05 | −1.2530E−05 | −3.4565E−06 | −3.6375E−06 |
| S4 | −3.3060E−04 | 1.1409E−04 | −4.2539E−05 | 7.2466E−06 |
| S5 | −6.2475E−04 | 2.3812E−04 | −5.5041E−06 | 2.7222E−05 |
| S6 | −1.0242E−03 | 9.2747E−05 | 5.2606E−05 | −5.2555E−06 |
| S7 | −8.8747E−04 | 2.0330E−04 | −1.0887E−04 | −5.2921E−05 |
| S8 | −8.3239E−04 | 1.5106E−04 | −1.1710E−04 | 2.7304E−05 |
| S9 | −6.2349E−04 | 1.4305E−04 | −7.5386E−05 | 1.9243E−05 |
| S10 | 7.9872E−04 | 4.3808E−04 | 1.3148E−04 | 4.2643E−05 |
| S11 | 1.4660E−03 | −3.0995E−05 | −1.5708E−04 | 8.7665E−05 |
| S12 | 5.7376E−03 | −2.8717E−03 | 9.2347E−04 | −1.5257E−04 |
| S13 | 3.7659E−03 | 1.2150E−03 | −1.2527E−03 | 2.3787E−04 |
| S14 | 7.8387E−03 | −3.5081E−03 | 4.8957E−04 | −4.8793E−04 |

Figures 14A, 14B:
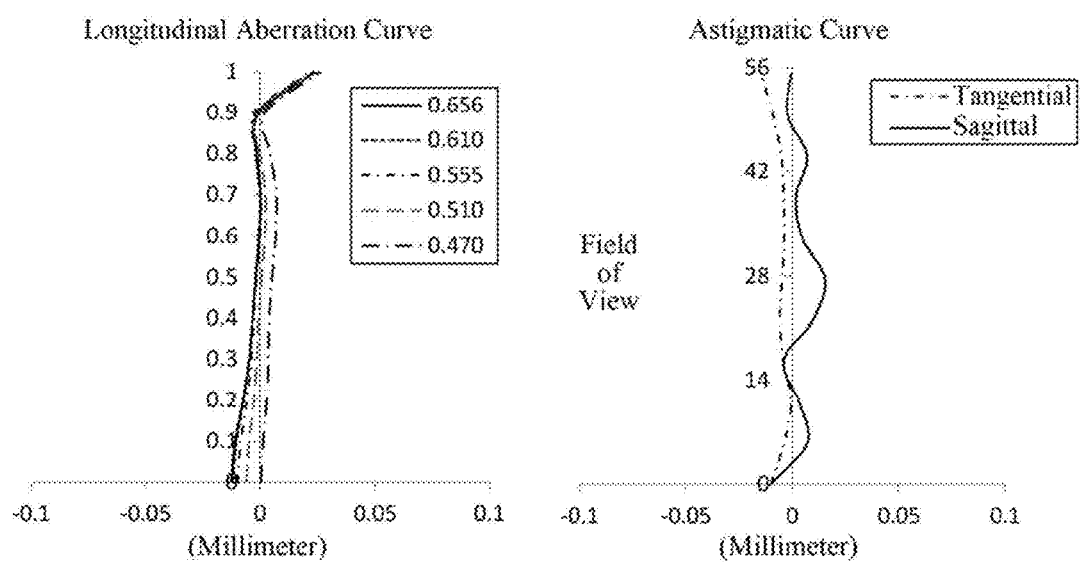
FIGS. 14A to 14C illustrate a longitudinal aberration curve, an astigmatic curve, and a lateral color curve of the optical imaging system of the example 7, respectively.
Figure 14C:
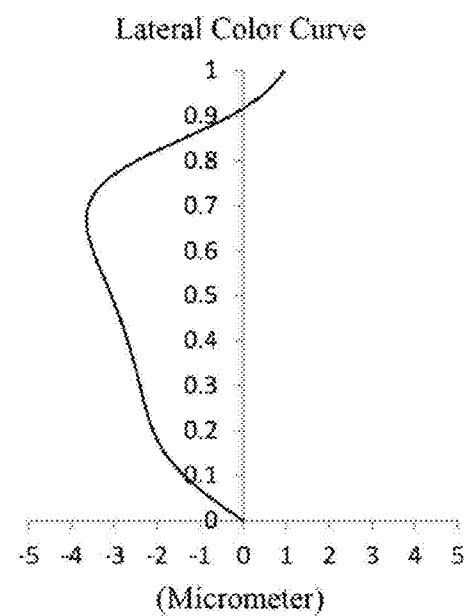

FIG. 14A illustrates a longitudinal aberration curve of the optical imaging system according to example 7, representing deviations of focal points converged by light of different wavelengths after passing through the system. FIG. 14B illustrates an astigmatic curve of the optical imaging system according to example 7, representing a curvature of a tangential plane and a curvature of a sagittal plane. FIG. 14C illustrates a lateral color curve of the optical imaging system according to example 7, representing deviations of different image heights on an imaging plane after light passes through the system. It can be seen from FIG. 14A to FIG. 14C that the optical imaging system provided in example 7 may achieve good image quality.

Example 8

An optical imaging system according to example 8 of the present disclosure is described below with reference to FIG.

Figure 15:
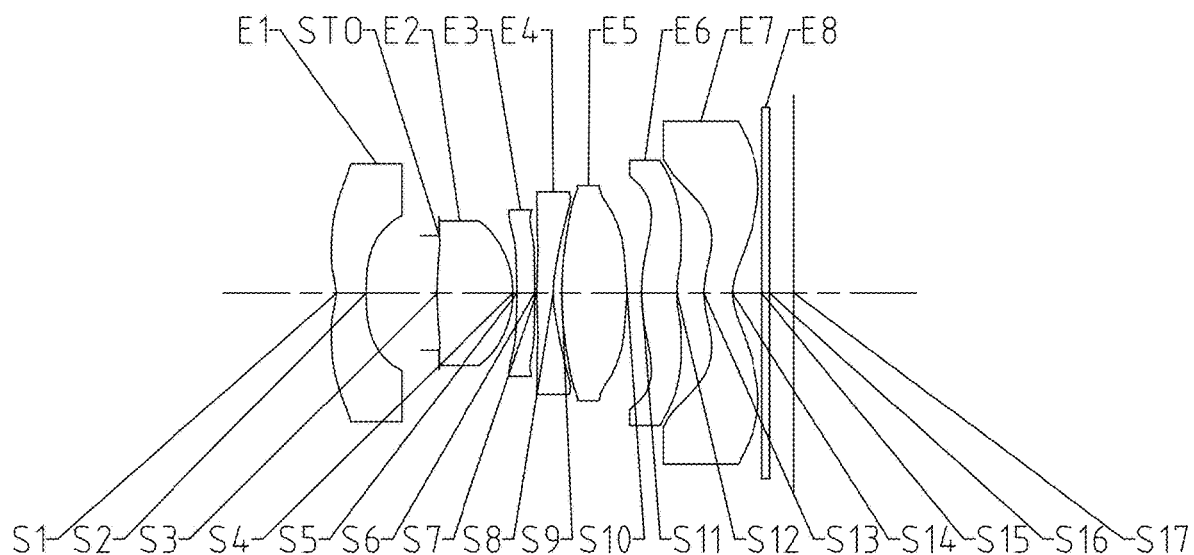
FIG. 15 illustrates a schematic structural view of an optical imaging system according to example 8 of the present disclosure.
Figure 16A:
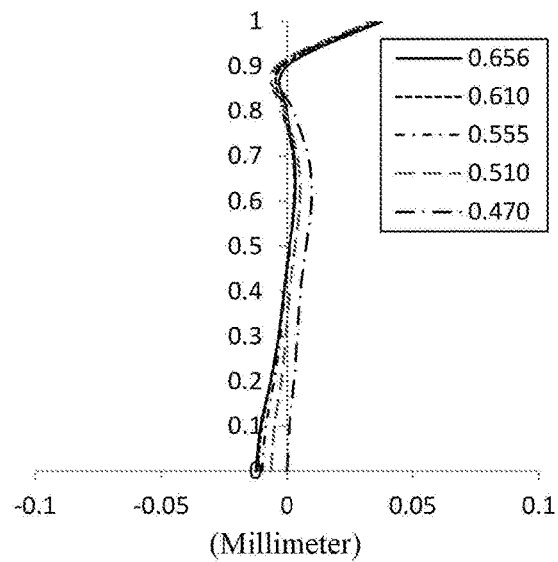
FIGS. 16A to 16C illustrate a longitudinal aberration curve, an astigmatic curve, and a lateral color curve of the optical imaging system of the example 8, respectively.
Figure 16B:
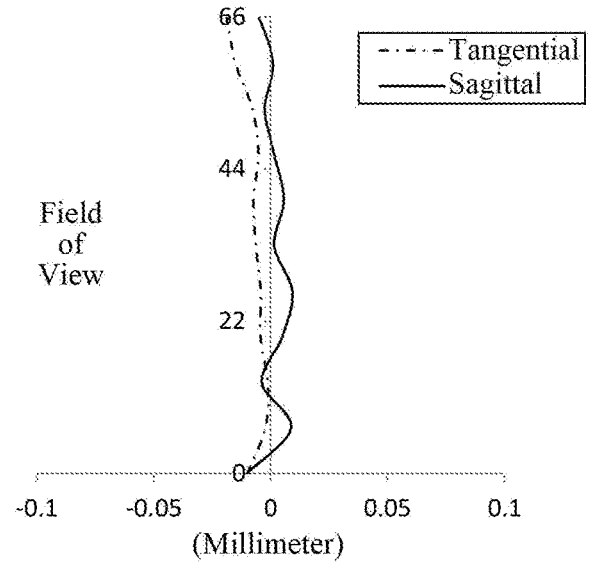
Figure 16C:
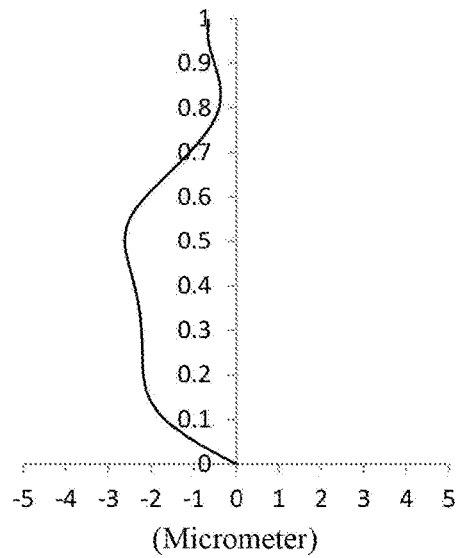

15 to FIG. 16C. FIG. 15 shows a schematic structural view of the optical imaging system according to example 8 of the present disclosure.

As shown in FIG. 15, the optical imaging system includes a first lens E1, a stop STO, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 8, a total effective focal length f of the optical imaging system is 1.98 mm, an aperture number Fno of the optical imaging system is 1.70, an on-axis distance TTL from the object-side surface S1 of the first lens E1 to the imaging plane S17 is 6.42 mm, half of a diagonal length ImgH of an effective pixel area on the imaging plane S17 is 2.75 mm, and half of a maximal field-of-view Semi-FOV is 65.9°.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 400.0000 | | | | |
| S1 | Aspheric | −4.4832 | 0.4631 | 1.55 | 56.1 | −3.98 | −48.8831 |
| S2 | Aspheric | 4.3612 | 1.0129 | | | | −39.4747 |
| STO | Spherical | Infinite | −0.0266 | | | | |
| S3 | Aspheric | 4.6075 | 1.0634 | 1.55 | 56.1 | 1.89 | 26.1063 |
| S4 | Aspheric | −1.2199 | 0.0500 | | | | −1.5424 |
| S5 | Aspheric | −10.4709 | 0.2500 | 1.68 | 19.2 | −118.18 | 88.9903 |
| S6 | Aspheric | −12.1622 | 0.0350 | | | | 90.0000 |
| S7 | Aspheric | 9.8620 | 0.2250 | 1.67 | 20.4 | −3.41 | 48.4458 |
| S8 | Aspheric | 1.8320 | 0.1168 | | | | −16.5809 |
| S9 | Aspheric | 5.8761 | 0.8846 | 1.55 | 56.1 | 7.76 | 9.8780 |
| S10 | Aspheric | −14.3993 | 0.2227 | | | | 89.3071 |
| S11 | Aspheric | 2.6854 | 0.5565 | 1.55 | 56.1 | 5.05 | −3.0633 |
| S12 | Aspheric | 99.0000 | 0.3077 | | | | 90.0000 |
| S13 | Aspheric | 1.0226 | 0.4000 | 1.64 | 56.1 | −7.69 | −5.8720 |
| S14 | Aspheric | 0.7178 | 0.4142 | | | | −3.1208 |
| S15 | Spherical | Infinite | 0.1100 | 1.62 | 64.2 | | |
| S16 | Spherical | Infinite | 0.3361 | | | | |
| S17 | Spherical | Infinite | | | | | |

TABLE 16

| Surface number | A4 | A6 | A8 | A10 | A12 |
|---|---|---|---|---|---|
| S1 | 4.9170E−01 | −9.4622E−02 | 1.3675E−02 | −3.6720E−03 | 1.6128E−03 |
| S2 | 2.9135E−01 | −2.4624E−03 | 2.8951E−03 | −8.3071E−05 | 7.3135E−05 |
| S3 | −3.6524E−02 | −4.9515E−03 | −8.3859E−04 | −1.5765E−04 | −4.6550E−05 |
| S4 | −1.4447E−02 | −1.1249E−02 | 2.2266E−03 | −9.9907E−04 | 3.5901E−04 |
| S5 | −2.2905E−02 | −5.7246E−03 | 8.5842E−03 | −1.2203E−03 | 3.7272E−04 |
| S6 | −7.5618E−03 | −5.3002E−03 | 9.5212E−03 | −7.0716E−05 | 5.6805E−05 |
| S7 | −1.1857E−01 | 9.7179E−03 | 3.3313E−03 | 2.3635E−04 | −3.2078E−04 |
| S8 | 1.1699E−02 | −8.9390E−03 | 1.9546E−03 | −1.4924E−03 | 2.9177E−04 |
| S9 | −1.4979E−02 | −3.6692E−03 | 1.2766E−03 | 7.7352E−04 | −1.1699E−04 |
| S10 | −5.0351E−01 | 6.2196E−02 | −1.9921E−03 | 4.4512E−03 | 1.5626E−03 |
| S11 | −4.9414E−01 | −4.9746E−02 | 4.2279E−03 | 9.9522E−04 | 2.8729E−03 |
| S12 | −4.9909E−02 | −3.0220E−02 | 1.5141E−02 | 1.2042E−03 | −2.4675E−04 |
| S13 | −1.4346E+00 | 3.0819E−01 | 3.6116E−03 | −2.3629E−03 | −7.5139E−03 |
| S14 | −1.3252E+00 | 2.3658E−01 | −8.7312E−02 | 3.2027E−02 | −7.9054E−03 |

TABLE 16-continued

| Surface number | A14 | A16 | A18 | A20 |
|---|---|---|---|---|
| S1 | −3.6274E−04 | 8.0280E−05 | −3.3956E−05 | 6.1591E−06 |
| S2 | 8.4243E−05 | 6.4205E−06 | 2.2746E−05 | 2.5386E−06 |
| S3 | −1.3026E−05 | −9.6888E−06 | −2.1428E−06 | −3.1395E−06 |
| S4 | −1.4005E−04 | 4.3313E−05 | −9.1319E−06 | 7.5207E−07 |
| S5 | −3.5561E−04 | 1.2257E−04 | −8.7592E−06 | 4.3086E−06 |
| S6 | −2.8524E−04 | 2.7169E−05 | 1.5409E−05 | −1.9026E−06 |
| S7 | −1.7053E−04 | 4.8843E−05 | 1.8046E−05 | −7.0029E−06 |
| S8 | −2.1042E−04 | 7.8208E−05 | −3.4760E−05 | 6.2030E−06 |
| S9 | −1.3047E−05 | −1.0638E−05 | −1.1573E−06 | 1.4840E−06 |
| S10 | 9.1070E−04 | 7.3151E−05 | 1.1786E−04 | −1.3480E−05 |
| S11 | 3.0528E−03 | −3.7499E−04 | −2.5275E−04 | −3.5319E−05 |
| S12 | 1.6489E−03 | −3.3610E−03 | 6.0160E−04 | 3.1834E−04 |
| S13 | −1.6751E−03 | 7.0025E−04 | −2.7073E−04 | 3.6373E−04 |
| S14 | 3.9914E−03 | −1.0494E−03 | 2.9261E−04 | −1.0087E−04 |

FIG. 16A illustrates a longitudinal aberration curve of the optical imaging system according to example 8, representing deviations of focal points converged by light of different wavelengths after passing through the system. FIG. 16B illustrates an astigmatic curve of the optical imaging system according to example 8, representing a curvature of a tangential plane and a curvature of a sagittal plane. FIG. 16C illustrates a lateral color curve of the optical imaging system according to example 8, representing deviations of different image heights on an imaging plane after light passes through the system. It can be seen from FIG. 16A to FIG. 16C that the optical imaging system provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| f1/f2 | −2.11 | −2.12 | −2.10 | −2.09 | −2.07 | −2.11 | −2.09 | −2.11 |
| f4/f | −1.74 | −1.70 | −1.75 | −1.75 | −1.72 | −1.73 | −1.75 | −1.73 |
| f7/f6 | −1.31 | −1.71 | −1.56 | −2.09 | −1.30 | −1.52 | −2.09 | −1.52 |
| R1/R4 | 3.67 | 3.65 | 3.60 | 3.59 | 3.57 | 3.68 | 3.59 | 3.68 |
| R3/R2 | 1.05 | 1.05 | 1.04 | 1.04 | 1.05 | 1.06 | 1.04 | 1.06 |
| R9/(R8 + R11) | 1.34 | 1.21 | 1.37 | 1.70 | 1.31 | 1.30 | 1.70 | 1.30 |
| (R13 + R14)/(R13 − R14) | 4.74 | 5.44 | 4.72 | 4.68 | 4.71 | 5.71 | 4.68 | 5.71 |
| CT5/(CT3 + CT4) | 1.84 | 1.82 | 1.84 | 1.84 | 1.82 | 1.86 | 1.84 | 1.86 |
| ΣCT/CT2 | 3.63 | 3.68 | 3.62 | 3.54 | 3.73 | 3.61 | 3.54 | 3.61 |
| ΣAT/T12 | 1.74 | 1.73 | 1.78 | 1.83 | 1.69 | 1.74 | 1.83 | 1.74 |
| CT6/T67 | 1.83 | 1.94 | 1.67 | 1.45 | 2.18 | 1.81 | 1.45 | 1.81 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising:
    a plurality of lenses consisting of a first lens, a second lens, a third lens, a fourth lens, a fifth lens, a sixth lens and a seventh lens, which are sequentially arranged from an object side to an image side of the optical imaging system along an optical axis,
    wherein,
    each of the first lens to the seventh lens has refractive power;
    an object-side surface of the first lens is a concave surface, and an image-side surface of the first lens is a concave surface;
    an object-side surface of the second lens is a convex surface, and an image-side surface of the second lens is a convex surface; and
    an object-side surface of the third lens is a concave surface, and an image-side surface of the third lens is a convex surface;
    wherein −2.0<f4/f<−1.5,
    Semi-FOV≥55°,
    where f4 is an effective focal length of the fourth lens, f is a total effective focal length of the optical imaging system, and Semi-FOV is half of a maximal field-of-view of the optical imaging system, and
    wherein −2.5<f1/f2<−2.0,
    wherein f1 is an effective focal length of the first lens, and f2 is an effective focal length of the second lens.

2. The optical imaging system according to claim 1, wherein −2.5<f7/f6<−1.0,
where f6 is an effective focal length of the sixth lens, and f7 is an effective focal length of the seventh lens.

3. The optical imaging system according to claim 1, wherein 3.5<R1/R4<4.0,
where R1 is a radius of curvature of the object-side surface of the first lens, and R4 is a radius of curvature of the image-side surface of the second lens.

4. The optical imaging system according to claim 1, wherein 1.0<R3/R2<1.5,
where R2 is a radius of curvature of the image-side surface of the first lens, and R3 is a radius of curvature of the object-side surface of the second lens.

5. The optical imaging system according to claim 1, wherein 4.5<(R13+R14)/(R13−R14)<6.0,
where R13 is a radius of curvature of an object-side surface of the seventh lens, and R14 is a radius of curvature of an image-side surface of the seventh lens.

6. The optical imaging system according to claim 1, wherein 1.0<R9/(R8+R11)<2.0,
where R8 is a radius of curvature of an image-side surface of the fourth lens, R9 is a radius of curvature of an object-side surface of the fifth lens, and R11 is a radius of curvature of an object-side surface of the sixth lens.

7. The optical imaging system according to claim 1, wherein 1.5<CT5/(CT3+CT4)<2.0,
where CT3 is a center thickness of the third lens along the optical axis, CT4 is a center thickness of the fourth lens along the optical axis, and CT5 is a center thickness of the fifth lens along the optical axis.

8. The optical imaging system according to claim 1, wherein 3.5<ΣCT/CT2<4.0,
where ΣCT is a sum of center thicknesses of the first lens to the seventh lens along the optical axis, and CT2 is a center thickness of the second lens along the optical axis.

9. The optical imaging system according to claim 1, wherein 1.0<τAT/T12<2.0,
where τAT is a sum of spaced intervals between each two adjacent lenses of the first lens to the seventh lens along the optical axis, and T12 is a spaced interval between the first lens and the second lens along the optical axis.

10. The optical imaging system according to claim 1, wherein 1.0<CT6/T67<2.5,
where CT6 is a center thickness of the sixth lens along the optical axis, and T67 is a spaced interval between the sixth lens and the seventh lens along the optical axis.

11. The optical imaging system according to claim 1, wherein N3>1.60, N4>1.60, and N7>1.60,
where N3 is a refractive index of the third lens, N4 is a refractive index of the fourth lens, and N7 is a refractive index of the seventh lens.

12. The optical imaging system according to claim 1, wherein V3<25.0, and V4<25.0,
where V3 is an Abbe number of the third lens, and V4 is an Abbe number of the fourth lens.

13. An optical imaging system, comprising:
a plurality of lenses consisting of a first lens, a second lens, a third lens, a fourth lens, a fifth lens, a sixth lens and a seventh lens, which are sequentially arranged from an object side to an image side of the optical imaging system along an optical axis,
wherein,
each of the first lens to the seventh lens has refractive power;
an object-side surface of the first lens is a concave surface, and an image-side surface of the first lens is a concave surface;
an object-side surface of the second lens is a convex surface, and an image-side surface of the second lens is a convex surface; and
an object-side surface of the third lens is a concave surface, and an image-side surface of the third lens is a convex surface;
wherein −2.0<f4/f<−1.5, and
3.5<ΣCT/CT2<4.0,
where f4 is an effective focal length of the fourth lens, f is a total effective focal length of the optical imaging system, ΣCT is a sum of center thicknesses of the first lens to the seventh lens along the optical axis, and CT2 is a center thickness of the second lens along the optical axis, and
wherein −2.5<f1/f2<−2.0,
wherein f1 is an effective focal length of the first lens, and f2 is an effective focal length of the second lens.

14. The optical imaging system according to claim 13, wherein −2.5<f7/f6<−1.0,
where f6 is an effective focal length of the sixth lens, and f7 is an effective focal length of the seventh lens.

15. The optical imaging system according to claim 13, wherein
3.5<R1/R4<4.0, and
1.0<R3/R2<1.5,
where R1 is a radius of curvature of the object-side surface of the first lens, R4 is a radius of curvature of the image-side surface of the second lens, R2 is a radius of curvature of the image-side surface of the first lens, and R3 is a radius of curvature of the object-side surface of the second lens.

16. The optical imaging system according to claim 13, wherein 4.5<(R13+R14)/(R13−R14)<6.0,
where R13 is a radius of curvature of an object-side surface of the seventh lens, and R14 is a radius of curvature of an image-side surface of the seventh lens.

17. The optical imaging system according to claim 13, wherein 1.0<R9/(R8+R11)<2.0,
where R8 is a radius of curvature of an image-side surface of the fourth lens, R9 is a radius of curvature of an object-side surface of the fifth lens, and R11 is a radius of curvature of an object-side surface of the sixth lens.

18. The optical imaging system according to claim 13, wherein 1.5<CT5/(CT3+CT4)<2.0,
where CT3 is a center thickness of the third lens along the optical axis, CT4 is a center thickness of the fourth lens along the optical axis, and CT5 is a center thickness of the fifth lens along the optical axis.

* * * * *